US011866121B2

(12) United States Patent
Nakagawa et al.

(10) Patent No.: US 11,866,121 B2
(45) Date of Patent: Jan. 9, 2024

(54) ELECTRIC MOBILITY VEHICLE

(71) Applicant: WHILL, Inc., Tokyo (JP)

(72) Inventors: Satoshi Nakagawa, Tokyo (JP);
Hiroyuki Tsukamoto, Tokyo (JP);
Masahiro Toriyama, Tokyo (JP);
Shogo Onishi, Tokyo (JP); Ren Akama, Tokyo (JP); Shuyu Hsu, Tokyo (JP); Shin Nagata, Tokyo (JP)

(73) Assignee: WHILL, INC., Tokyo (JP)

( * ) Notice: Subject to any disclaimer, the term of this patent is extended or adjusted under 35 U.S.C. 154(b) by 0 days.

(21) Appl. No.: 17/928,543

(22) PCT Filed: May 31, 2022

(86) PCT No.: PCT/JP2022/022044
§ 371 (c)(1),
(2) Date: Nov. 29, 2022

(87) PCT Pub. No.: WO2022/255333
PCT Pub. Date: Dec. 8, 2022

(65) Prior Publication Data
US 2023/0192222 A1    Jun. 22, 2023

(30) Foreign Application Priority Data

Jun. 1, 2021    (JP) .................................. 2021-092200

(51) Int. Cl.
*B62J 1/08* (2006.01)
*B62K 15/00* (2006.01)
(Continued)

(52) U.S. Cl.
CPC ................. *B62K 5/007* (2013.01); *B62J 1/08* (2013.01); *B62K 15/006* (2013.01); *A61G 5/04* (2013.01);
(Continued)

(58) Field of Classification Search
CPC ...... B62K 5/003; B62K 5/007; A61G 5/0841; A61G 5/0833
(Continued)

(56) References Cited

U.S. PATENT DOCUMENTS 9,533,729 B1 * 1/2017 Chan ......................... B62J 1/08
2009/0020350 A1 * 1/2009 Wu ....................... B62K 15/008
180/208

(Continued)

FOREIGN PATENT DOCUMENTS

CN      110934696 A      3/2020
CN      111252179 A      6/2020
(Continued)

OTHER PUBLICATIONS

Sugie et al.; "Electric Wheelchair", Design U.S. Appl. No. 35/513,050, filed Jun. 1, 2021, Corresponds to International Publication of International Design Registration No. DM/215506 (published on Dec. 3, 2021), pp. 1-22.
(Continued)

*Primary Examiner* — Minnah L Seoh
*Assistant Examiner* — Felicia L. Brittman
(74) *Attorney, Agent, or Firm* — BainwoodHuang

(57) ABSTRACT

An electric mobility vehicle including a front-wheel-side body, a rear-wheel-side body, a seat on which a passenger sits in an in-use state, and a linking mechanism that links the front-wheel-side body with the rear-wheel-side body so as to be pivotable about a pivoting axis extending in a vehicle width direction. The electric mobility vehicle is foldable by pivoting the front-wheel-side body and the rear-wheel-side body relative to each other in a vehicle front-to-rear direction. The electric mobility vehicle includes a footrest provided in the front-wheel-side body, a front-end roller or a front-end caster provided in the front-wheel-side body and
(Continued)

disposed at a vehicle front side relative to a front end of the front wheel in the in-use state, and comes into contact with the floor surface in the folded state to make the electric mobility vehicle stand alone.

18 Claims, 16 Drawing Sheets

(51) Int. Cl.
  *A61G 5/08* (2006.01)
  *A61G 5/12* (2006.01)
  *B62J 25/04* (2020.01)
  *A61G 5/04* (2013.01)
  *B62K 5/007* (2013.01)
(52) U.S. Cl.
  CPC ............ *A61G 5/0841* (2016.11); *A61G 5/128* (2016.11); *B62J 25/04* (2020.02); *B62K 2015/005* (2013.01)
(58) Field of Classification Search
  USPC ........................................................ 280/283
  See application file for complete search history.

(56) References Cited

U.S. PATENT DOCUMENTS

| 2009/0308676 A1* | 12/2009 | Wang | B62K 5/007 |
| | | | 180/208 |
| 2016/0089285 A1 | 3/2016 | Cheng | |
| 2020/0156727 A1 | 5/2020 | Chang | |

FOREIGN PATENT DOCUMENTS

| CN | 211943625 U | 11/2020 |
| EP | 3656651 A1 | 5/2020 |
| JP | 2003146282 A | 5/2003 |
| JP | 2015077349 A | 4/2015 |

OTHER PUBLICATIONS

European Search Report dated Oct. 9, 2023 for European Patent Application No. 22805744.4; 5 pages.

* cited by examiner

ELECTRIC MOBILITY VEHICLE

TECHNICAL FIELD

The present invention relates to an electric mobility vehicle.

BACKGROUND ART

As an electric mobility vehicle, there is a known folding wheelchair: that includes front wheels that are caster wheels, a front-wheel-side body that has the front wheels, rear wheels that are normal wheels, a rear-wheel-side body that has the rear wheels, a linking mechanism that links the front-wheel-side body with the rear-wheel-side body in a pivotable manner in the front-to-rear direction of the vehicle, and a seat on which a passenger sits; and that can be folded by pivoting the front-wheel-side body with respect to the rear-wheel-side body. For example, see Japanese Unexamined Patent Application, Publication No. 2015-77349.

SUMMARY

A first aspect of the present invention is an electric mobility vehicle including: a front-wheel-side body including a front wheel; a rear-wheel-side body including a rear wheel; a seat on which a passenger sits in an in-use state; and a linking mechanism that links the front-wheel-side body with the rear-wheel-side body so as to be pivotable about a pivoting axis extending in a vehicle width direction, wherein the electric mobility vehicle is foldable by employing an X-shaped frame. A folded state is achieved by pivoting the front-wheel-side body and the rear-wheel-side body relative to each other in a vehicle front-to-rear direction so that the front wheel and the rear wheel are brought close to each other, the electric mobility vehicle includes: a footrest which is provided in the front-wheel-side body and on which the passenger on the seat places his/her feet, a front-end roller or a front-end caster provided in the front-wheel-side body and disposed at a vehicle front side of the electric mobility vehicle relative to a front end of the front wheel in the in-use state, wherein the front-end roller or the front-end caster does not come into contact with a floor surface in the in-use state, and wherein the front-end roller or the front-end caster comes into contact with the floor surface in the folded state to make the electric mobility vehicle stand alone.

DESCRIPTION OF EMBODIMENTS

An electric mobility vehicle according to an embodiment of the present invention will be described below with reference to the drawings.

Figure 1:
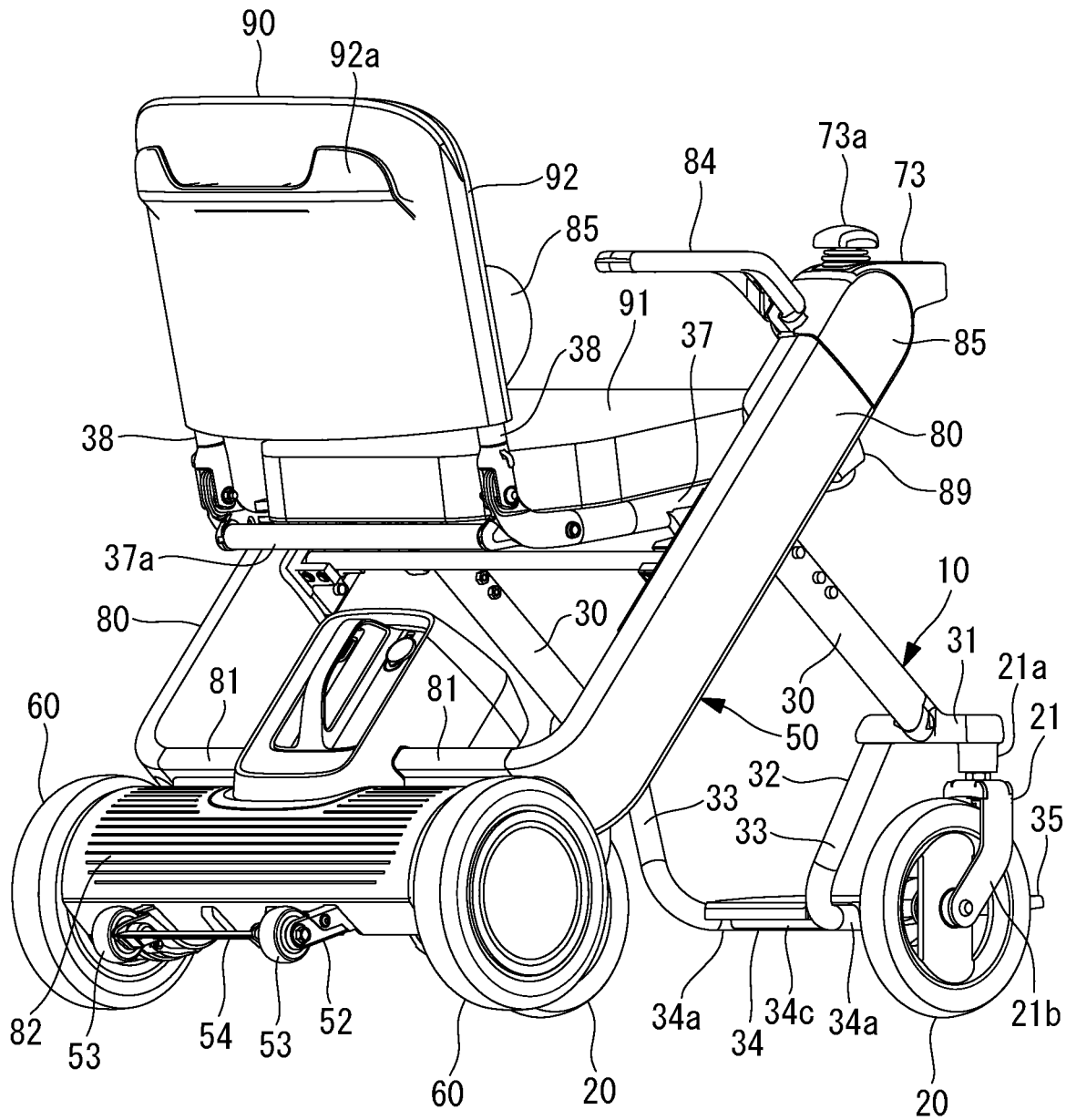
FIG. 1 is a rear perspective view of an electric mobility vehicle according to an embodiment of the present invention.
Figure 2:
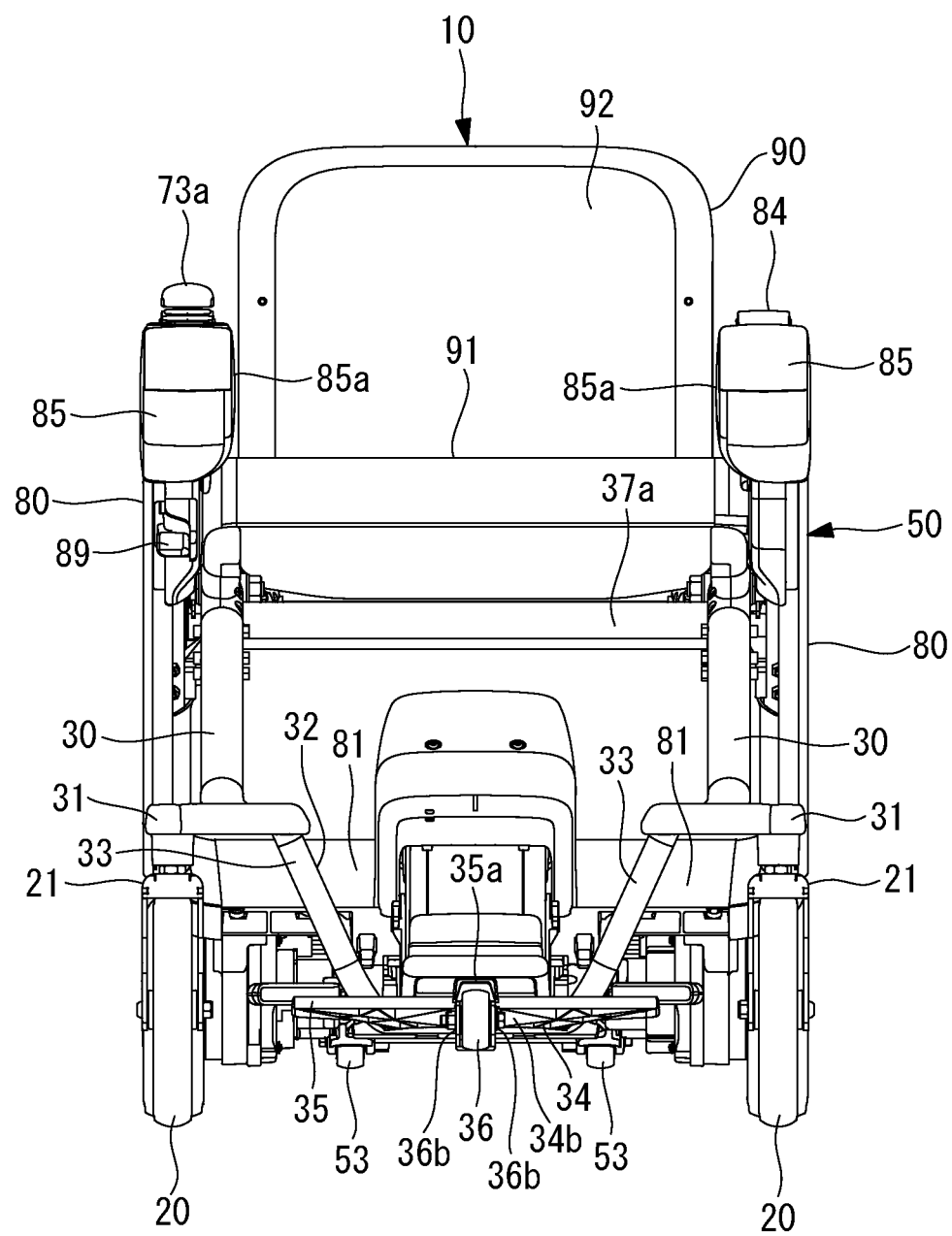
FIG. 2 is a front view of the electric mobility vehicle of this embodiment.
Figure 3:
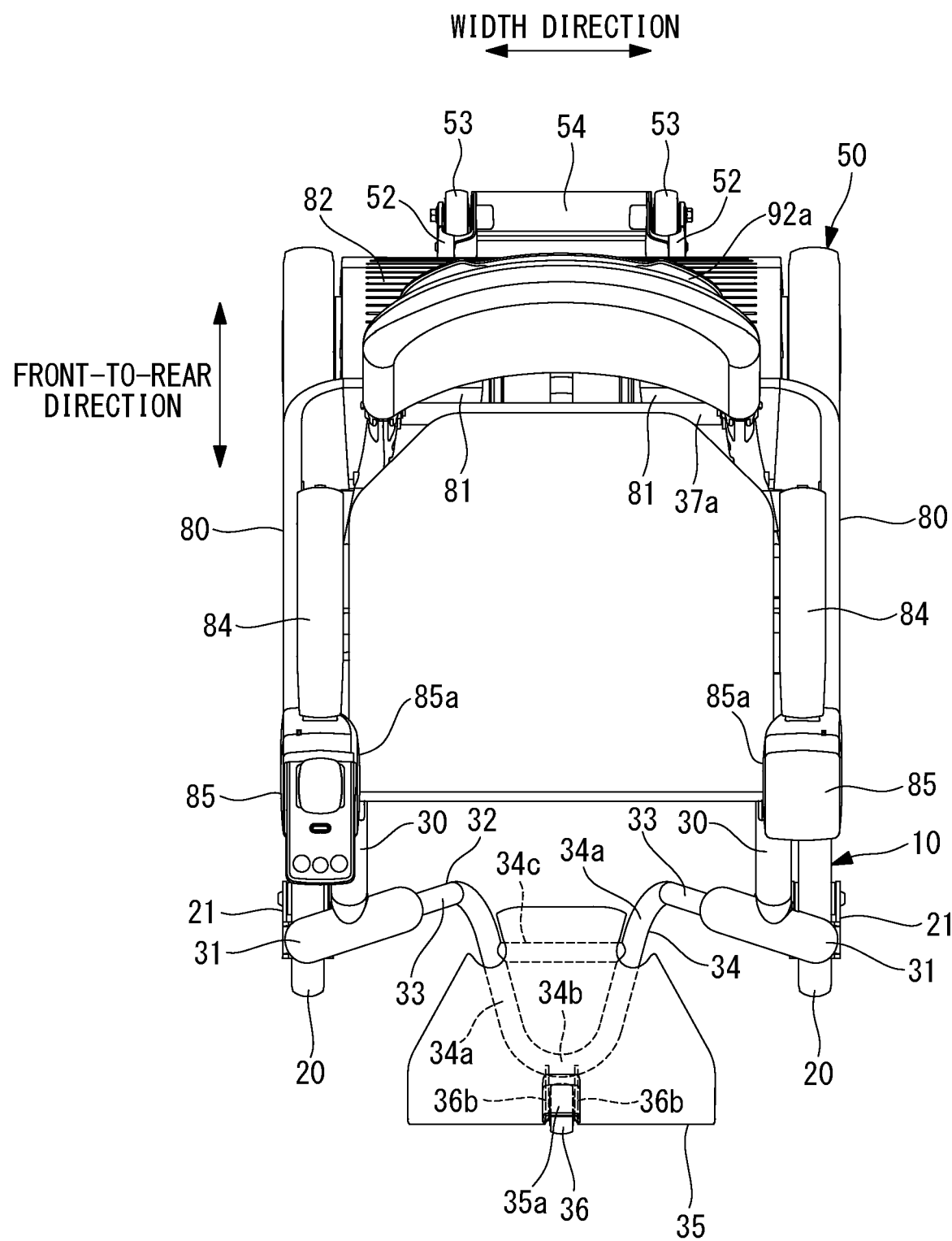
FIG. 3 is a plan view of the electric mobility vehicle of this embodiment.

As shown in FIGS. 1-4, this electric mobility vehicle has a front-wheel-side body 10 and a rear-wheel-side body 50 and one person sits to rides on the electric mobility vehicle. In this embodiment, the width direction of the electric mobility vehicle shown in FIG. 3 is a direction in which a pair of rear wheels 60 of the rear-wheel-side body 50 are arranged or the horizontal direction extending along axles of the rear wheels 60. The width direction of the electric mobility vehicle may be the direction in which a pair of front wheels 20 of the front-wheel-side body 10 are arranged. The front-to-rear direction of the electric mobility vehicle shown in FIG. 3 is the horizontal direction perpendicular to the width direction of the electric mobility vehicle or a direction in which the electric mobility vehicle travels in a straight line.

In the following description, directions will be described with reference to a state in which the front wheels 20 and the rear wheels 60 are in contact with or close to a horizontal flat surface. In addition, in the following descriptions, there are cases in which the front-to-rear direction of the electric mobility vehicle will be referred to simply as the front-to-rear direction or the vehicle front-to-rear direction, and the width direction of the electric mobility vehicle will be referred to simply as the width direction or the vehicle width direction. In the following description, right and left correspond to the width direction and front and rear correspond to the front-to-rear direction. In addition, in the following descriptions, the state shown in FIGS. 1-4 will be referred to as the in-use state and the state shown in FIG. 5 will be referred to as the folded state.

Figure 4:
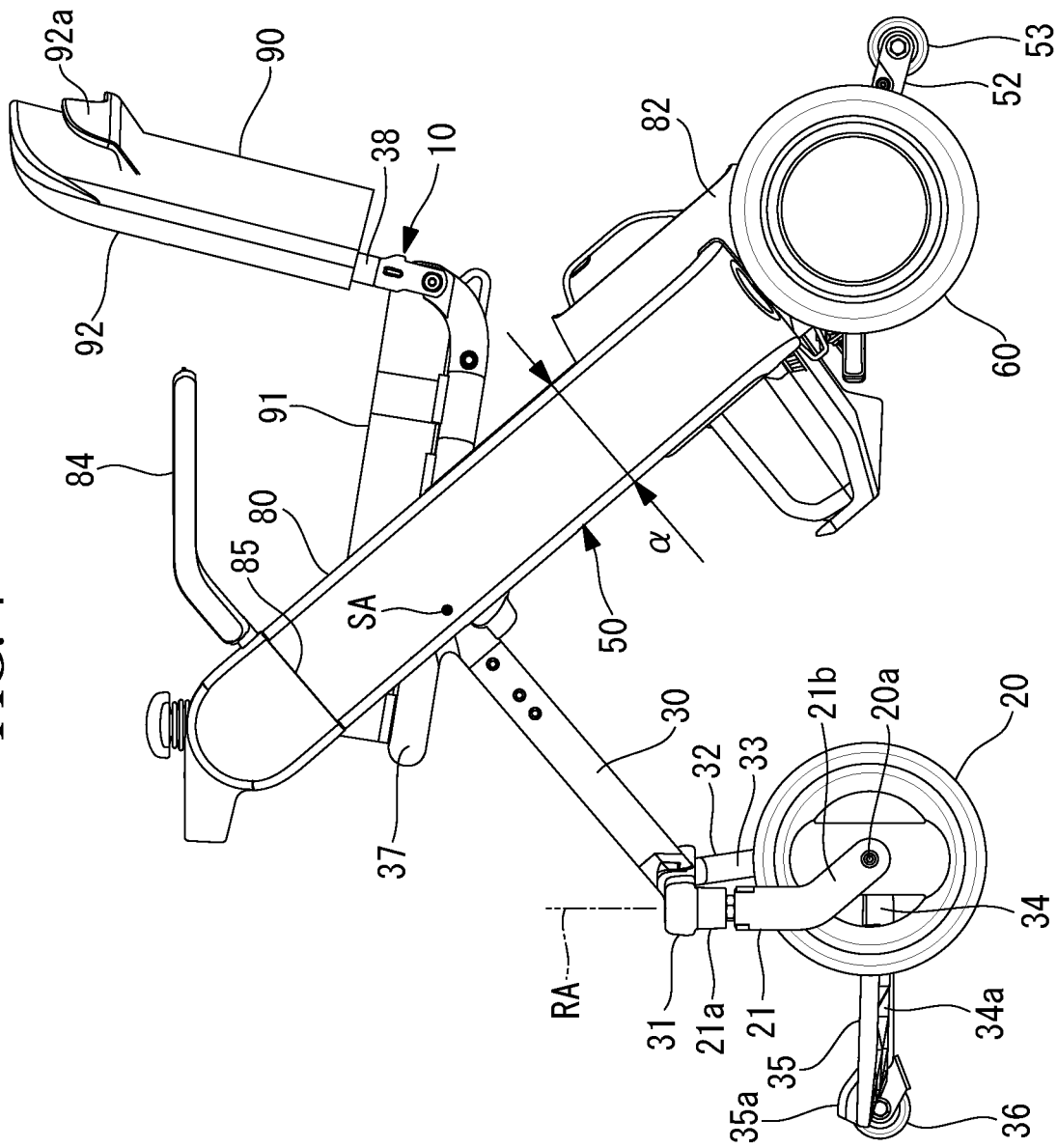
FIG. 4 is a side view of the electric mobility vehicle of this embodiment.
Figure 5:
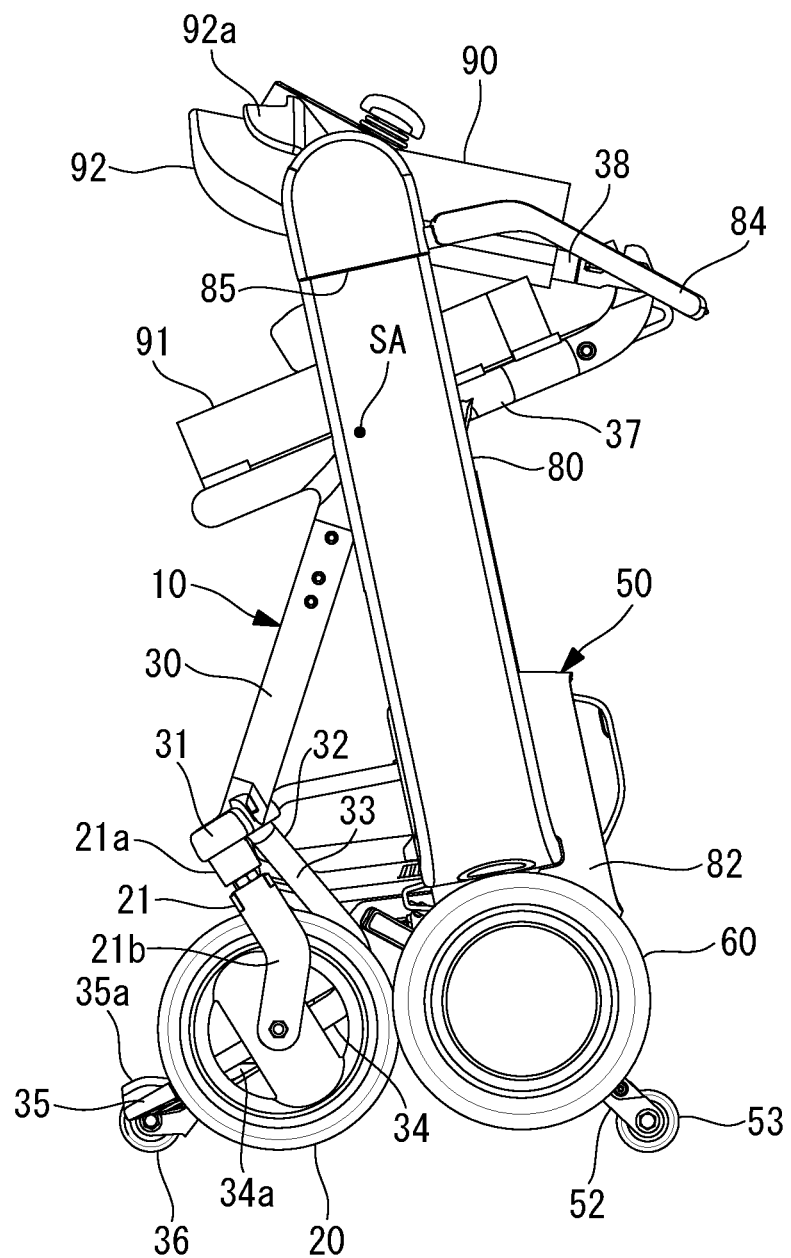
FIG. 5 is a side view showing a folded state of the electric mobility vehicle of this embodiment.

As shown in FIGS. 4 and 5, the front-wheel-side body 10 and the rear-wheel-side body 50 are pivotable with respect to each other about a pivoting axis SA extending in the width direction. In this embodiment, an intermediate portion of the front-wheel-side body 10 in the height direction is supported by an intermediate portion of the rear-wheel-side body 50 in the height direction so as to be pivotable in the front-to-rear direction. In this embodiment, the front-wheel-side body 10 and the rear-wheel-side body 50 form an X-shape when viewed from the width direction. The electric mobility vehicle of this embodiment can also be considered to have an X-shaped frame for folding, and, in the following embodiment, a lower side relative to the pivoting axis SA in the X-shaped frame may be allowed to be considerably larger than an upper side of the pivoting axis SA. In addition, also in the case in which the upper side relative to the pivoting axis SA in the X-shaped frame is considerably larger than the lower side relative to the pivoting axis SA, there are cases in which the following embodiment is realized by shifting the positions of the front wheels 20 and the rear wheels 60 in the width direction, etc.

The front-wheel-side body 10 has a pair of front-wheel support frames 30 that are disposed, in the in-use state, lower than the pivoting axis SA and extend at least downward and that are arranged in the width direction with a spacing therebetween. In this embodiment, the front-wheel support frames 30 diagonally extend downward and forward. Front-wheel support portions 31 are secured to bottom-end portions of the respective front-wheel support frames 30 and the front-wheel support portions 31 extend toward outside and inside in the width direction of the electric mobility vehicle from the bottom-end portions of the front-wheel support frames 30. In the following descriptions, there are cases in which the outside and the inside in the width direction of the electric mobility vehicle will be respectively referred to simply as the outside and the inside in the width direction.

In this embodiment, as shown in FIG. 4, the respective front wheels 20 are caster wheels in which forks 21 rotate about rotation axes RA extending in the up-down direction, and rotation axes 20a of the respective front wheels 20 are not disposed directly below the rotation axes RA. For example, as shown in FIG. 4, when the electric mobility vehicle is moving forward, the rotation axes 20a are disposed at a rear side relative to the rotation axes RA.

Shaft portions 21a are provided on top ends of the forks 21, and the forks 21 are supported by the shaft portions 21a at outside portions in the width direction of the front-wheel support portions 31 and rotatable about the rotation axes RA. Known radial bearings, thrust bearings, or the like are interposed between the shaft portions 21a and the front-wheel support portions 31.

The respective forks 21 have a pair of fork plates 21b that extend downward, and axles of the front wheels 20 are supported by bottom-end sides of the pair of fork plates 21b. In addition, the axles support the front wheels 20 so as to be rotatable about the rotation axes 20a. Known radial bearings or the like are interposed between the axles and the front wheels 20.

The front-wheel-side body 10 has a footrest frame 32 that extends at least downward from the front-wheel support portions 31. The footrest frame 32 has a pair of up-down-direction frames 33 that respectively extend downward from the pair of front-wheel support portions 31 and a connection portion 34 that connects bottom ends of the pair of up-down-direction frames 33 with each other. As shown in FIG. 3, the connection portion 34 has a pair of front-rear-direction frames 34a that respectively extend toward a front side of the vehicle from the bottom ends of the pair of up-down-direction frames 33 and a front-side connection frame 34b that connects front-end sides of the pair of front-to-rear-direction frames 34a with each other.

In addition, the connection portion 34 has, as shown in FIG. 3, at least one rear-side connection frame 34c that connects rear-end sides of the pair of front-to-rear-direction frames 34a with each other or intermediate portions thereof with each other. Only one of the front-side connection frame 34b and the rear-side connection frame 34c may be provided.

A foot plate (footrest) 35 is attached to the connection portion 34 and pivotable in the front-to-rear direction.

In this embodiment, an intermediate portion or a rear-end portion in the front-to-rear direction of the foot plate 35 is attached to the rear-side connection frame 34c so as to be pivotable in the front-to-rear direction; however, the foot plate 35 may be attached to other parts of the footrest frame 32 in a pivotable manner. In addition, the foot plate 35 may be secured to the footrest frame 32.

A front-end roller 36 or a front-end caster is supported at a front-end portion of the connection portion 34 and the front-end roller 36 or the front-end caster is rotatable in the front-to-rear direction. It is preferable that the diameter of the front-end roller 36 or the front-end caster be smaller than those of the front wheels 20. It is preferable that the diameter of the front-end roller 36 or the front-end caster be equal to or less than ⅔ of the diameters of the front wheels 20. Specifically, the diameter of the front-end roller 36 or the front-end caster is preferably equal to or less than 10 cm, and more preferably equal to or less than 8 cm.

Note that, in this embodiment, the diameters of the front wheels 20 are equal to or greater than 12 cm, preferably equal to or greater than 15 cm, and more preferably equal to or greater than 18 cm. As a result of employing the front wheels having large diameters in this way, the step climbing performance of the electric mobility vehicle is effectively enhanced.

In this electric mobility vehicle, the difference between the diameters of the rear wheels 60 and the diameters of the front wheels 20 is equal to or less than 4 cm, and more preferably equal to or less than 2.5 cm. Accordingly, although the electric mobility vehicle is of a folding type, as described above, a person viewing the electric mobility vehicle and a user thereof such as a passenger tend to more strongly feel a sense of security that said electric mobility vehicle is stable when the electric mobility vehicle has the front wheels 20 whose diameters are equivalent to those of the rear wheels 60 serving as the driving wheels. This contributes to comfortable use of the electric mobility vehicle by the user. Note that there are cases in which the diameters of the rear wheels 60 are greater than the diameters of the front wheels 20 by more than 4 cm.

In this embodiment, the front-side connection frame 34b has a roller support portion 36b and the roller support portion 36b is a pair of support members extending in the front-to-rear direction. The roller support portion 36b support an axle of the front-end roller 36. The respective support members are, for example, plates, and rear ends of the respective support members are secured to the front-side connection frame 34b. The rear ends of the respective support members may be secured to the rear-side connection frame 34c or the like and the respective support members are part of the connection portion 34.

As described above, the front-end roller 36 is disposed at a position corresponding to a center portion in the width direction of the electric mobility vehicle. In addition, as shown in FIGS. 3 and 4, the front-end roller 36 is supported by the footrest frame 32 in a form in which a portion of the front-end roller 36 protrudes at least toward the front side from the front-end portion of the foot plate 35. In this embodiment, the portion of the front-end roller 36 also protrudes downward from the front-end portion of the foot plate 35. Note that the front-end roller 36 may be supported by the footrest frame 32 in a form in which a portion of the front-end roller 36 protrudes at least diagonally downward or downward from the front-end portion of the foot plate 35.

In this embodiment, a wheelhouse 35*a* that is open at least in the front direction is provided at the front-end portion of the foot plate (footrest) 35, and a portion of the front-end roller 36 is disposed in the wheelhouse 35*a*. Accordingly, it is less likely for mud, salt water, or the like on shoes of the passenger to become attached to the front-end roller 36. In addition, as described above, a portion of the front-end roller 36 protrudes forward, diagonally downward, or the like from the footrest. In the case in which only a portion thereof protrudes as explained above, it is less likely for mud, salt water, or the like on shoes of the passenger to become attached to areas in the vicinity of bearings of the front-end roller 36. Because these structures respectively maintain the function of the front-end roller 36 over a long period, said structures are useful for reducing the time and effort for the maintenance of the front-end roller 36.

Note that the feet of the passenger may be supported by, for example, the front-to-rear-direction frames 34*a*, the front-side connection frame 34*b*, and the rear-side connection frame 34*c* of the footrest frame 32 without providing the foot plate 35. In this case, the footrest frame 32 serves as a footrest. In this case also, the front-end roller 36 is supported by the footrest frame 32 in a form in which a portion of the front-end roller 36 protrudes at least toward the front side and/or diagonally downward from the front-end portion of the footrest frame 32 serving as a footrest. In one example, a portion of the front-end roller 36 also protrudes downward from the front-end portion of the footrest frame 32.

In addition, the foot plate 35 may connect the bottom ends of the pair of up-down-direction frames 33 with each other without providing the connection portion 34. In this case, the foot plate (footrest) 35 serves as the connection portion, and the front-end roller 36 is supported by the foot plate 35 in a form in which a portion of the front-end roller 36 protrudes at least toward the front side and/or diagonally downward from the front-end portion of the foot plate 35.

In addition, top-end portions of the pair of up-down-direction frames 33 may be directly secured to the pair of front-wheel support frames 30, or the top-end portions of the pair of up-down-direction frames 33 may be secured to other portions of the front-wheel-side body 10.

Structures in the front-wheel-side body 10 that are required to have strength are manufactured by using a metal, a combination of a metal and a plastic, or the like and other portions are manufactured by using a material such as a plastic, a rubber, or the like, selected, as appropriate, in accordance with functions, external appearances, and so forth. This is also the same for the rear-wheel-side body 50.

The rear-wheel-side body 50 has a pair of up-down-direction extension portions 80 that are arranged in the width direction with a spacing therebetween and the respective up-down-direction extension portions 80 have, in the in-use state, lower-side portions that are disposed lower than the pivoting axis SA. In this embodiment, as shown in FIG. 4, etc., the lower-side portions of the respective up-down-direction extension portions 80 extend diagonally forward from the bottom-end to the position at which the pivoting axis SA is located. The dimension (thicknesses) a of each of the up-down-direction extension portions 80 in a direction orthogonal to the length direction and a direction corresponding to the front-to-rear direction of the electric mobility vehicle (FIG. 4) are equal to or greater than 8 cm over substantially the entirety of the above-described lower-side portions.

Because the electric mobility vehicle is a folding type, as described above, the electric mobility vehicle naturally tends to appear frail; however, because the electric mobility vehicle has the pair of up-down-direction extension portions having the above-described dimension α, a person viewing the electric mobility vehicle and a user thereof such as a passenger feel a sense of security that said electric mobility vehicle is stable, which contributes to comfortable use thereof by the user. Such a sense of security is particularly useful in the case in which said electric mobility vehicle is rented, the case in which the electric mobility vehicle is used off road, including mountain roads, and so forth. The same effect could be afforded so long as the dimension α is equal to or greater than 8 cm within a range of 40% or greater, preferably 60% or greater, and more preferably 70% or greater in the lower-side portion. Each of the up-down-direction extension portions 80 has, for example, a metal frame in the interior thereof, a portion or the entirety of said frame is covered with a plastic cover, and said cover is formed with the dimension α. It is preferable that, in the up-down-direction extension portions 80, the dimensions thereof in the vehicle width direction be less than the dimension α.

In this embodiment, the respective up-down-direction extension portions 80 extend diagonally forward from the lower side thereof so as to reach above a seat surface 91 of a seat and also have the dimension a on the upper side relative to the pivoting axis SA. In one example, top ends of the respective up-down-direction extension portions 80 are higher than the seat surface 91 by 8 cm or more, and more preferably cm or more. Accordingly, a person viewing the electric mobility vehicle and a user thereof such as a passenger tend to more strongly feel a sense of security that said electric mobility vehicle is stable.

In addition, as shown in FIG. 3, etc., as a result of the dimension α being maintained over substantially the entirety of the up-down-direction extension portions 80 in the length direction and of the substantially entirety of up-down-direction extension portions 80 extending diagonally forward with a certain inclination, the electric mobility vehicle tends to give an impression of being stable. Substantially the entirety refers to preferably 70% or greater, more preferably 80% or greater, and is 90% or greater in this embodiment.

Figure 6:
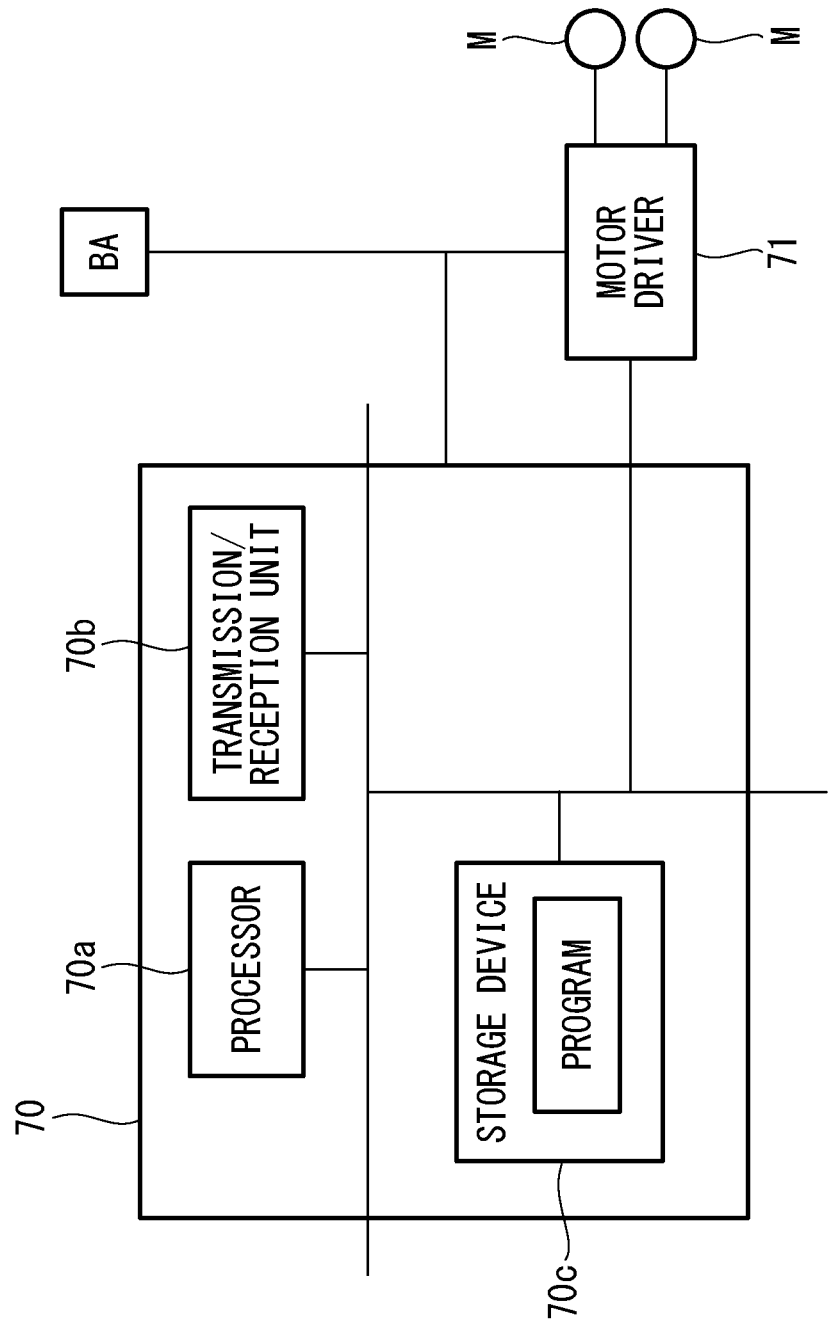
FIG. 6 is a block diagram of the electric mobility vehicle of this embodiment.

The bottom ends of the respective up-down-direction extension portions 80 are supported by a base portion 82 of the rear-wheel-side body 50. In this embodiment, as shown in FIG. 1, the bottom ends of the respective up-down-direction extension portions 80 are respectively supported by or secured to a center portion of the base portion 82 via width-direction extension portions 81. At said center portion, a battery BA is inserted in a detachable manner. A controller 70, a pair of motors M serving as driving devices, and a motor driver 71, shown in FIG. 6, are provided in the base portion 82, and power supplied by the mounted battery BA is supplied to the controller 70 and the motor driver 71 via power lines.

As shown in FIG. 1, etc., the rear-wheel-side body 50 has, for example, a pair of fall prevention members 52 that extend rearward from the base portion 82. Front-end portions of the respective fall prevention members 52 are secured to, for example, the base portion 82 of the rear-wheel-side body 50 or secured to the base portion 82 in a form in which the fall prevention members 52 do not tilt upward. The pair of fall prevention members 52 respectively have rear-end rollers 53 at rear-end portions thereof, and the respective rear-end rollers 53 are rotatable in the front-to-rear direction. As shown in FIG. 4, the rear-end portions of the fall prevention members 52 are disposed at a rear side relative to the rear ends of the rear wheels 60.

For example, when the electric mobility vehicle is about to fall backward when climbing a steep upslope or the like, the fall prevention members 52 can come into contact with the floor surface and prevent the electric mobility vehicle from falling over. The pair of fall prevention members 52 are disposed with a spacing therebetween in the width direction. Said spacing is equal to or greater than 10 cm. A single fall prevention member 52 may extend rearward from the base portion 82, and the pair of rear-end rollers 53 may be attached to the fall prevention members 52 with a spacing therebetween in the width direction.

The rear-end rollers 53 for the fall prevention members are generally small. In this embodiment, it is preferable that the diameters of the rear-end rollers 53 be ½ or less, preferably ⅔ or less of the diameters of the front wheels 20.

When the electric mobility vehicle in the in-use state is placed on a horizontal surface, distances in the up-down-direction between the respective rear-end rollers 53 and the horizontal surface are equal to or less than 10 cm. The distance for preventing the electric mobility vehicle from falling over rearward is preferably equal to or less than 7 cm, more preferably equal to or less than 6 cm.

The pair of fall prevention members 52 are connected to each other by a foot placing plate 54 extending in the width direction. The foot placing plate 54 is the portion on which the user places a foot when folding and unfolding the electric mobility vehicle and is formed by bending a plate-like metal member.

The controller 70 has, for example, a processor 70a having a CPU, a transmission/reception unit 70b, and a storage device 70c having a non-volatile memory, a ROM, a RAM, etc. The storage device 70c stores a program for controlling the electric mobility vehicle. The processor 70a is operated on the basis of the program and transmits driving signals for driving the respective motors M to the motor driver 71 on the basis of signals from an operating portion 73 and a setting portion that are provided in top-end-side portions 85 of the up-down-direction extension portions 80.

The operating portion 73 having an operation lever 73a is provided at a top end of at least one of the right and left up-down-direction extension portions 80, and signals in accordance with operations of the operation lever 73a are transmitted to the controller 70 via wired or wireless communication. Instead of the operation lever 73a, operation buttons or a computer such as a tablet computer may be employed. In the case of said computer, an operation lever, operation buttons, etc. displayed on a display device thereof are operated by the user such as a passenger, and the computer also equipped with functions of the setting portion transmits signals in accordance with the operations to the controller 70 via a wired or wireless communication.

The setting portion, with which it is possible to perform various settings of the electric mobility vehicle, such as a maximum speed setting, a drive mode setting, and an electric mobility vehicle locking setting, is provided at a top end of at least one of the right and left up-down-direction extension portions 80. The setting portion is provided with a plurality of operation buttons, a display device, and so forth. Setting signals from the setting portion are transmitted to the controller 70 via wired or wireless communication and the settings of the electric mobility vehicle are registered or changed in the controller 70. There are cases in which the computer has the functions of the setting portion.

The rear wheels 60 are respectively provided at two sides in the width direction of the base portion 82, and the respective rear wheels 60 are driven by the corresponding motors M. In accordance with the driving speeds of the respective motors M, the electric mobility vehicle moves forward, moves forward while turning, moves backward, moves backward while turning, and rotates in a state in which the electric mobility vehicle little moves forward or backward.

Armrests 84 extend toward the rear sides from the top-end-side portions 85 of the respective up-down-direction extension portions 80, and the arms and hands of the passenger sitting on the seat 90 are placed on the armrests 84 and the top-end-side portions 85 of the up-down-direction extension portions 80.

The seat 90 has the seat surface 91 and a backrest 92. A grip portion 92a that the user or the like grips when folding or unfolding the electric mobility vehicle, when moving the electric mobility vehicle by pushing the electric mobility vehicle, etc. is provided on a back surface of the backrest 92.

In this embodiment, the seat surface 91 and the backrest 92 are supported by the front-wheel-side body 10. Specifically, the front-wheel-side body 10 has a pair of seat-surface support frames 37 that extend in the front-to-rear direction and backrest frames 38 that respectively extend upward from the rear ends of the pair of seat-surface support frames 37.

The pair of seat-surface support frames 37 are connected with each other by means of one or more width-direction frames 37a. In addition, the pair of backrest frames 38 are also connected to each other at top-end portions or the like thereof by means of a width-direction frame. In this embodiment, the seat-surface support frames 37 and the front-wheel support frames 30 are integrally formed. In addition, bottom ends of the backrest frames 38 are supported at rear ends of the seat-surface support frames 37 so as to be pivotable in the front-to-rear direction. Although the backrest frames 38 do not pivot rearward farther than the position indicated in FIGS. 1 and 4, the backrest frames 38 are pivotable toward the front side, in other words, toward the seat surface 91.

The rear-wheel-side body 50 is provided with, for example, a shaft 51 that extends in the vehicle width direction from metal frames 86 of the up-down-direction extension portions 80, and shaft holding portions H (FIG. 7), such as holes, provided in, for example, the front-wheel support frames 30 or the seat-surface support frames 37 of the front-wheel-side body 10 are supported by the shaft 51 so as to be rotatable about a center axis thereof. Said center axis coincides with the pivoting axis SA, and the front-wheel-side body 10 and the rear-wheel-side body 50 are pivotable with respect to each other about the pivoting axis SA. The shaft 51 may be provided in the front-wheel-side body 10 and the rear-wheel-side body 50 may be supported by the shaft 51. In addition, the front-wheel-side body 10 and the rear-wheel-side body 50 may be configured so as to be pivotable with respect to each other by means of other structures. In the case in which a plurality of shafts, holes, links, etc. are employed, the position of the pivoting axis SA could move in accordance with the pivoting movement.

Figure 7:
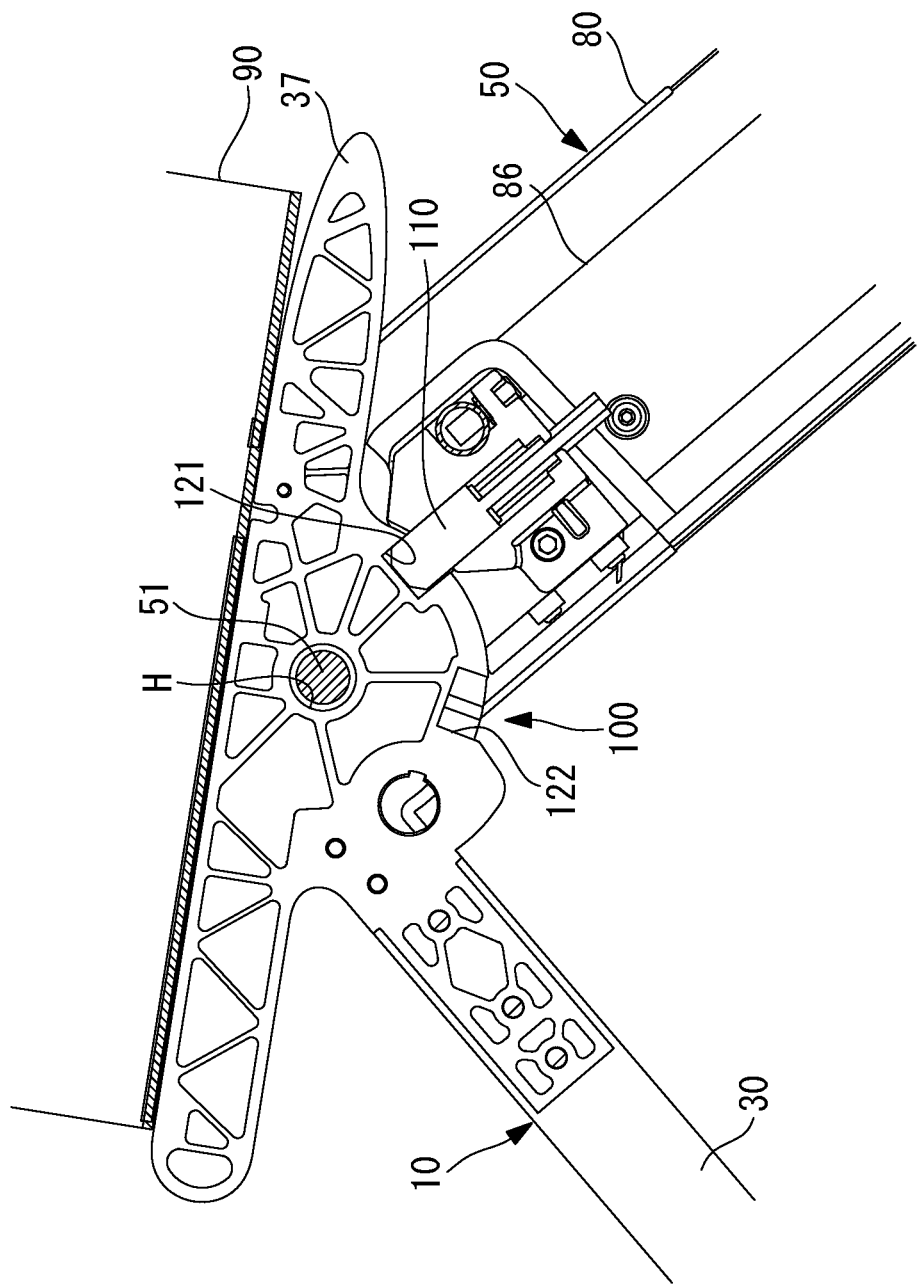
FIG. 7 is a longitudinal cross-sectional view of relevant portions of the electric mobility vehicle of this embodiment.

The electric mobility vehicle has a linking mechanism 100 that links the front-wheel-side body 10 to the rear-wheel-side body 50 so as to be pivotable in the vehicle-front-to-rear direction and that holds the electric mobility vehicle at least in the in-use state (FIG. 7).

Figure 8:
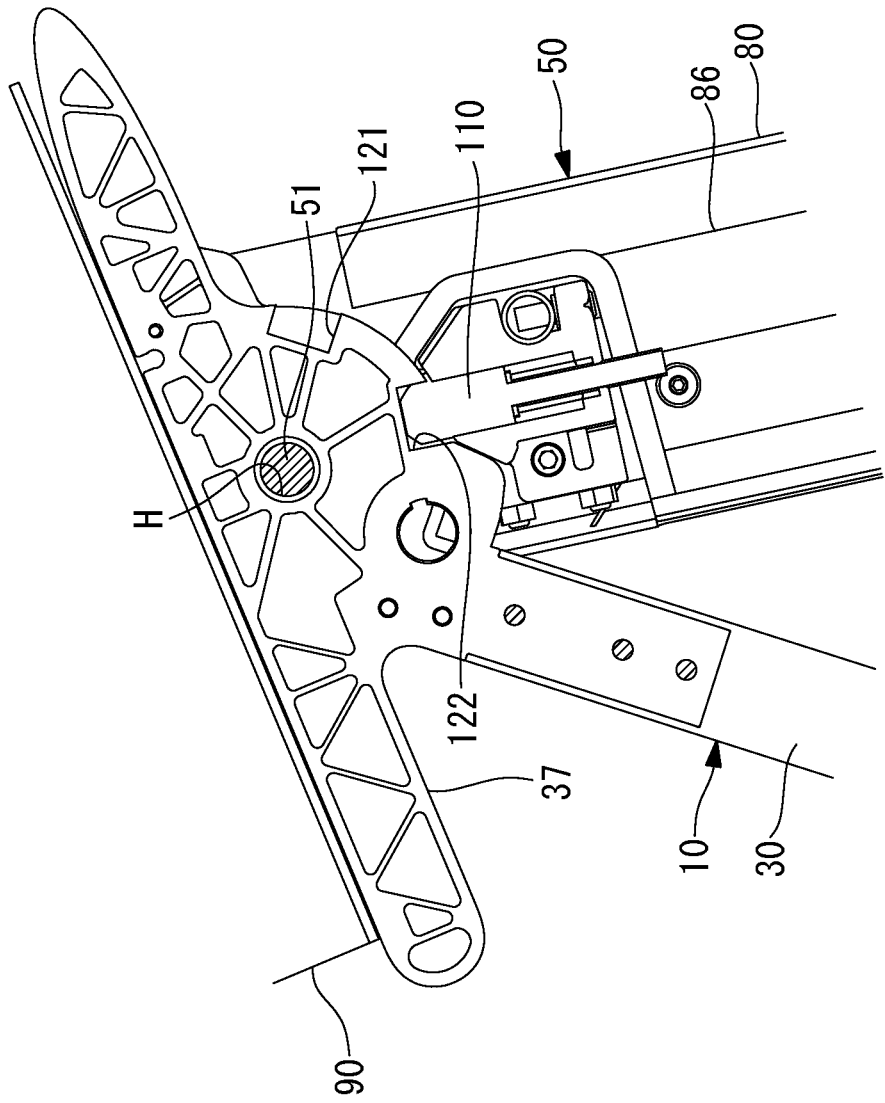
FIG. 8 is a longitudinal cross-sectional view of the relevant portions of the electric mobility vehicle of this embodiment in the folded state.

The linking mechanism 100 has the shaft 51 and the shaft holding portion H. In addition, as shown in FIGS. 7 and 8, the linking mechanism 100 has, for example, an engaging portion 110 that is a pin or the like provided in one of the front-wheel-side body 10 and the rear-wheel-side body 50, in which the shaft 51 is provided. In addition, the linking mechanism 100 has, in one of the front-wheel-side body 10 and the rear-wheel-side body 50, in which the shaft 51 is not provided, a first engaged portion 121 that is a hole or the like to which the engaging portion 110 is engaged in, for example, a circumferential direction centered on the pivoting axis SA. The engaging portion 110 and the first engaged portion 121 may engage with each other in another direction.

Figure 9:
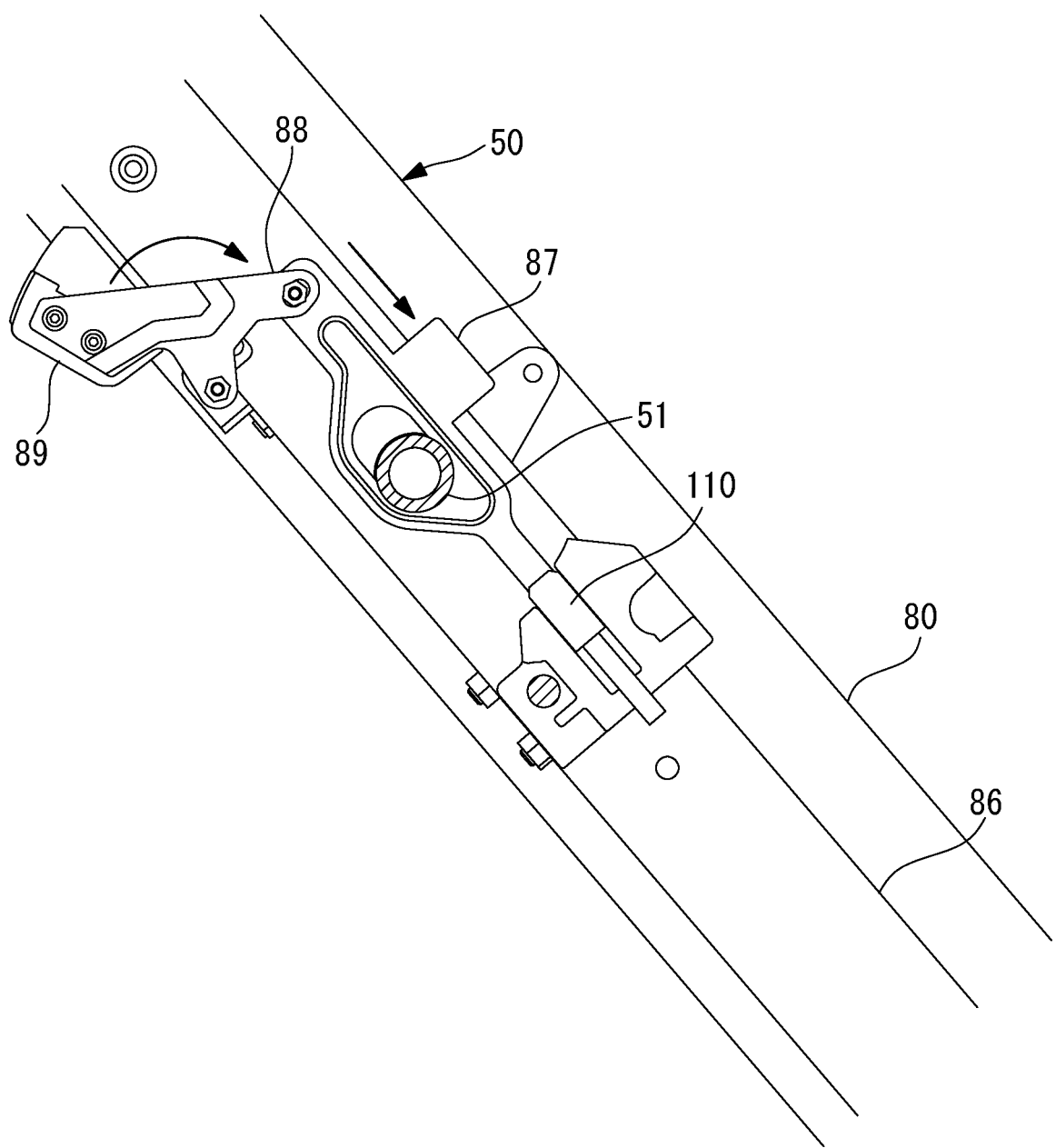
FIG. 9 is a longitudinal cross-sectional view of relevant portions of a up-down-direction extension portion of the electric mobility vehicle of this embodiment.

The engaging portion 110 is supported, for example, by the metal frame 86 of one of the up-down-direction extension portions 80 so as to be movable at least in one direction among the vehicle front-to-rear direction, the vehicle width direction, and the up-down-direction. In this embodiment, as shown in FIG. 9, the metal frame 86 extends in the longitudinal direction of the up-down-direction extension portion 80 and a slide member 87 is supported by the metal frame 86 so as to be movable in the longitudinal direction. The engaging portion 110 is secured to one end portion in the longitudinal direction of the slide member 87 and one end portion of a link member 88 is linked to the other end portion in the longitudinal direction of the slide member 87 so as to be pivotable in at least one of the vehicle front-to-rear direction and the up-down-direction.

An operated member 89, such as a button member, a lever, or the like, is attached to the other end portion of the link member 88, and at least a portion of the operated member 89 protrudes from the up-down-direction extension portions 80. A lever may be employed instead of the operated member 89. As shown in FIG. 9, when the user operates the operated member 89 in a pushing direction, the link member 88 is pivoted and the slide member 87 is moved in the longitudinal direction, and thus, the engagement between the engaging portion 110 and the first engaged portion 121 is released.

Note that, in this embodiment, in the in-use state, a portion of the engaging portion 110 is inserted into the first engaged portion 121 and the engaging portion 110 is engaged in the said circumferential direction with the first engaged portion 121. Accordingly, the electric mobility vehicle is held in the in-use state (FIG. 7).

When the engagement between the engaging portion 110 and the first engaged portion 121 is released in the in-use state, the user can cause the front-wheel-side body 10 and the rear-wheel-side body 50 to be pivoted with respect to each other, and, consequently, it is possible to put the electric mobility vehicle into the folded state (FIG. 5). This electric mobility vehicle is configured so as to stand alone in the folded state, as described below. Pivoting the backrest 92 forward of the vehicle in the folded state causes the electric mobility vehicle in the folded state to be more compact.

As shown in FIGS. 3 and 5, in this embodiment, when shifting to the folded state from the in-use state, the rear-wheel-side body 50 is pivoted by 20° or more about the pivoting axis SA in the folding direction and the front-wheel-side body 10 is also pivoted by 20° or more about the pivoting axis SA in the folding direction. This can also be described as the rear-wheel-side body 50 and the front-wheel-side body 10 being pivoted toward an upright position. It is preferable that the rear-wheel-side body 50 and the front-wheel-side body 10 be respectively pivoted by 15° or more about the pivoting axis SA.

As shown in the folded state in FIG. 5, the up-down-direction extension portions 80 have the dimension a over substantially the entirety thereof from the rear wheel 60 sides to the top ends thereof, and the up-down-direction extension portions 80 are also pivoted toward the upright position when being folded. Accordingly, the up-down-direction extension portions 80, which extend diagonally forward in the in-use state, mainly extend in the up-down-direction in the folded state. In the case in which an angle formed between the longitudinal direction of the up-down-direction extension portions 80 and the vertical direction is equal to or less than 25°, more preferably in the case in which said angle is equal to or less than 15°, the up-down-direction extension portions 80 are considered to mainly extend in the up-down-direction, and said angle is about 12° in FIG. 5. Said structures make the electric mobility vehicle in the folded state conspicuous with respect to other folding mobilities, a luggage, or the like. Specifically, the user can more easily find his/her electric mobility vehicle, which contributes to comfortable use thereof. In order to make the electric mobility vehicle conspicuous, "substantially the entirety" refers to preferably 70% or greater, more preferably 80% or greater, and is 90% or greater in this embodiment. Note that, in this embodiment, folding the electric mobility vehicle naturally causes the up-down-direction extension portions 80 to mainly extend in the up-down-direction, which also contributes to comfortable use by the user.

The linking mechanism 100 has a second engaged portion 122 in one of the front-wheel-side body 10 and the rear-wheel-side body 50, in which the shaft 51 is not provided, and the position of the second engaged portion 122 and the position of the first engaged portion 121 are different in the said circumferential direction.

In the folded state, the position of the engaging portion 110 is disposed at a position corresponding to the second engaged portion 122 and the portion of the engaging portion 110 is inserted into the second engaged portion 122 (FIG. 8). Accordingly, the engaging portion 110 engages with the second engaged portion 122 in the said circumferential direction, and pivoting-position restriction in which the position of the front-wheel-side body 10 with respect to the rear-wheel-side body 50 is restricted to the pivoting position of the folded state is performed. In other words, the folded state is maintained. In contrast, when the pivoting is performed until the position of the engaging portion 110 reaches the position corresponding to the first engaged portion 121, the portion of the engaging portion 110 is inserted into the first engaged portion 121.

Note that it is preferable that biasing members that bias the engaging portion 110 in the direction in which the engaging portion 110 is inserted in the first engaged portion 121 and the second engaged portion 122 be provided in, for example, the up-down-direction extension portions 80 of the rear-wheel-side body 50.

In this embodiment, in the state shown in FIG. 7, due to the weight of at least the front-wheel-side body 10 and the rear-wheel-side body 50, the front-wheel-side body 10 and the rear-wheel-side body 50 tend to be pivoted with respect to each other in the direction in which the front wheels 20 and the rear wheels 60 are apart from each other. Accordingly, the engaging portion 110 is placed in a state of being pushed against the first engaged portion 121 in the said circumferential direction.

In this state, it is not possible to remove the engaging portion 110 from the first engaged portion 121 by operating the operated member 89. Consequently, it is possible to avoid a situation in which the lock for maintaining the in-use state is unintentionally released. In this embodiment, in order to remove the engaging portion 110 from the first engaged portion 121, it is necessary to slightly pivot at least one of the front-wheel-side body 10 and the rear-wheel-side body 50 in the direction in which the rear wheels 60 and the front wheels 20 are brought close to each other, in other words, it is necessary to slightly pivot the at least one of them in the folding direction, while operating the operated member 89. For example, when the seat 90, which is a portion of the front-wheel-side body 10, is slightly lifted upward, a force in the folding direction is applied to the front-wheel-side body 10.

When slightly lifting the seat 90 of the front-wheel-side body 10 upward, the user can place his/her foot on the foot placing plate 54 of the rear-wheel-side body 50. Consequently, the user can more easily and stably perform the folding work.

Figure 10:
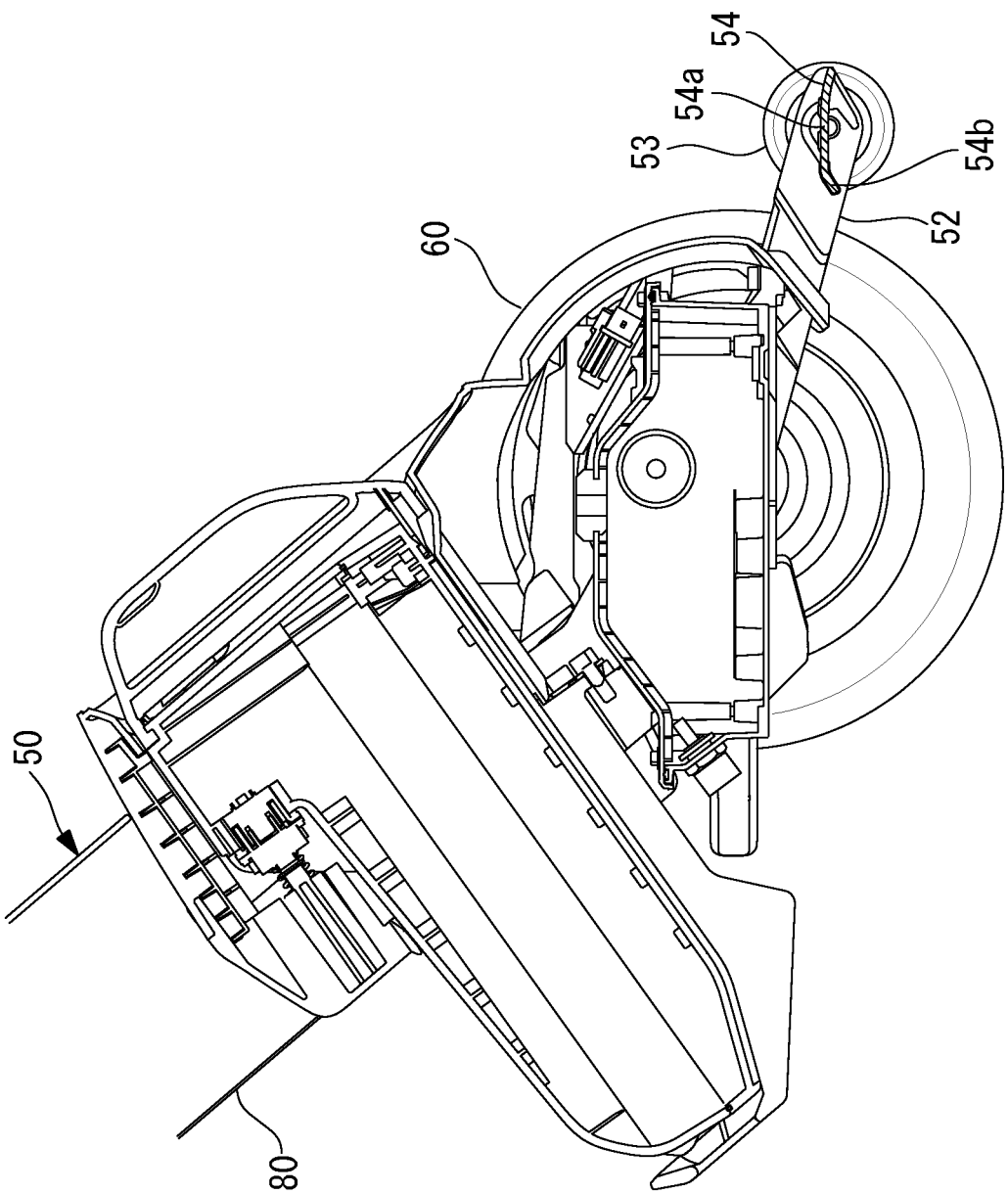
FIG. 10 is a longitudinal cross-sectional view of relevant portions of the electric mobility vehicle of this embodiment at a center in the width direction.
Figure 11:
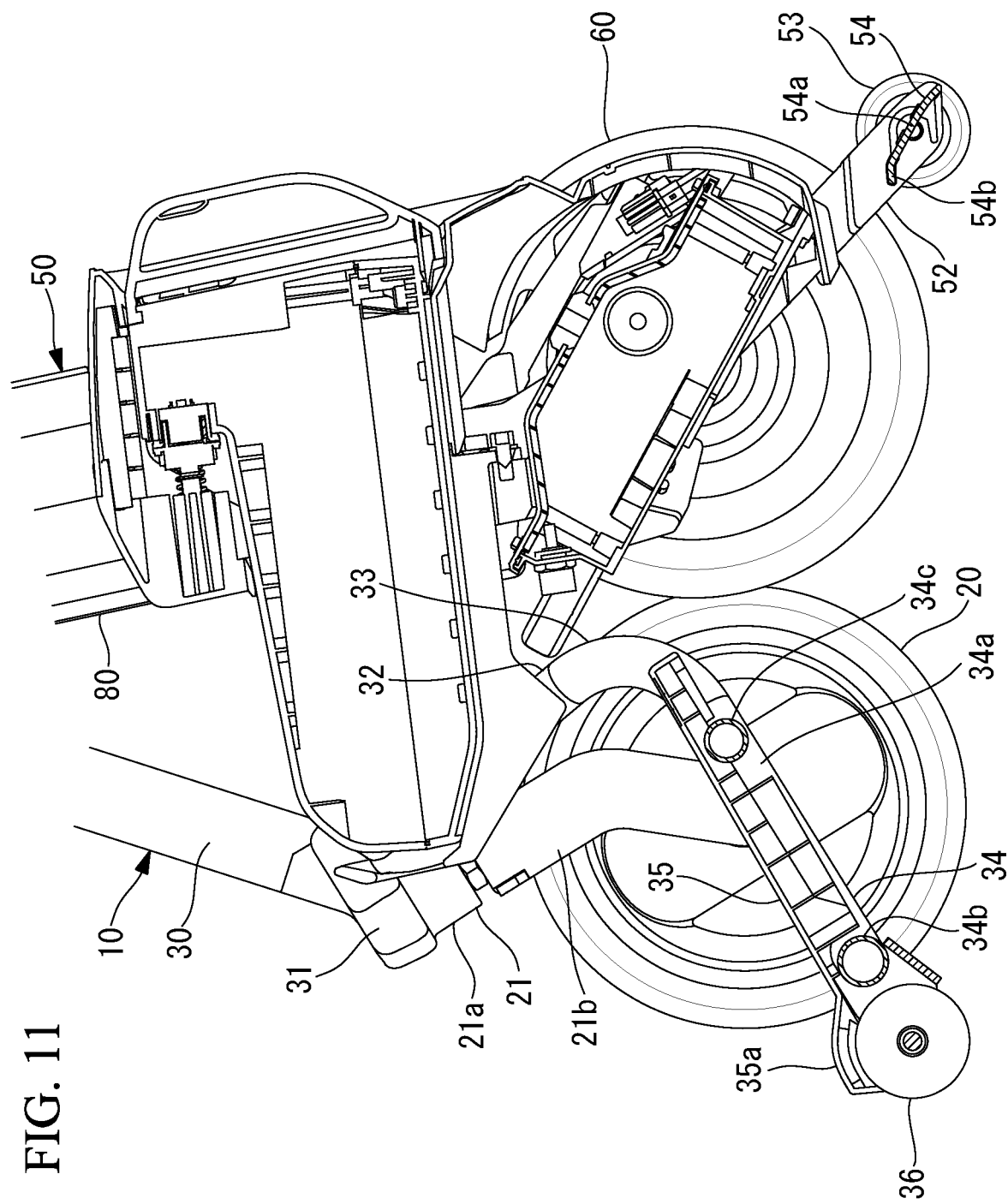
FIG. 11 is a longitudinal cross-sectional view of the relevant portions of the electric mobility vehicle of this embodiment at a center in the width direction in the folded state.

The foot placing plate 54, a cross-section of which is indicated by hatching in FIGS. 10 and 11, has: a horizontal portion 54a that extends, in the in-use state, toward the vehicle front side and in the substantially horizontal direction or diagonally upward; and an inclined portion 54b that extends toward the vehicle front side and diagonally downward from a front-end portion of the horizontal portion 54a.

The force applied to the foot placing plate 54 from the foot of the user is mainly applied to the horizontal portion 54a in the in-use state and a greater amount thereof is applied to the inclined portion 54b when shifting to the folded state. As a result of providing the inclined portion 54b, the user can easily apply force to the foot placing plate 54 when shifting to the folded state.

In the state shown in FIG. 8 also, due to the weights of the front-wheel-side body 10 and the rear-wheel-side body 50, the front-wheel-side body 10 and the rear-wheel-side body 50 tend to be pivoted with respect to each other in the direction in which the front wheels 20 and the rear wheels 60 are moved away from each other. Consequently, the engaging portion 110 is placed in a state in which the engaging portion 110 is pushed against the second engaged portion 122 in the said circumferential direction. In this state, it is not possible to remove the engaging portion 110 from the second engaged portion 122 by operating the operated member 89 and the front-wheel-side body 10 and the rear-wheel-side body 50 are locked in the pivoting position of the folded state. In this embodiment, in order to remove the engaging portion 110 from the second engaged portion 122, it is necessary to perform the work of pushing the operated member 89 and to pivot at least one of the front-wheel-side body 10 and the rear-wheel-side body 50 in the direction in which the rear wheels 60 and the front wheels 20 are brought close to each other, in other words, the folding direction. Consequently, the electric mobility vehicle is prevented from being unintentionally unfolded as a result of the operated member 89 being pushed by unintentional contact with a passerby or the like.

For example, the seat 90, which is a portion of the front-wheel-side body 10, is slightly lifted upward and a force in the folding direction is applied to the front-wheel-side body 10. When slightly lifting the seat 90 of the front-wheel-side body 10 upward, the user can place his/her foot on the foot placing plate 54 of the rear-wheel-side body 50. Consequently, the user can more easily and stably perform the folding work.

As has been described above, when pushing the operated member 89, at least one of the front-wheel-side body 10 and the rear-wheel-side body 50 is supported in a direction which is the same as that of being folded. Consequently, it is possible to effectively prevent a situation in which the front-wheel-side body 10 and the rear-wheel-side body 50 are not supported and only the operated member 89 is pushed, which releases the pivoting-position restriction, and the front-wheel-side body 10 and the rear-wheel-side body 50 consequently rapidly shift to the in-use state due to gravity. Because the weight of an electric mobility vehicle is often 10 kg or greater or 20 kg or greater, said configuration is useful for enhancing the safety thereof.

The force applied to the foot placing plate 54 from the foot of the user is mainly applied to the inclined portion 54b in the folded state and is mainly applied to the horizontal portion 54a when shifting to the in-use state. As a result of providing the inclined portion 54b, the user can easily apply the force to the foot placing plate 54 in the folded state. This contributes to comfortable use of the electric mobility vehicle by the user.

Here, as shown in FIG. 1 and etc., the operated member 89 is provided on a surface on the vehicle-front-side in at least one of the pair of up-down-direction extension portions 80 in the rear-wheel-side body 50 in the in-use state. Consequently, when the user slightly pivots the front-wheel-side body 10 in the folding direction with one of the hands, the user can naturally place the other hand at the position of the operated member 89. This contributes to comfortable use of the electric mobility vehicle by the user.

For example, on a horizontal floor surface, in order to shift to the folded state from the in-use state, the rear-wheel-side body 50 is pivoted with respect to the front-wheel-side body 10 so that the rear wheels 60 and the front wheels 20 are brought close to each other. In said process, the front-end roller 36 of the front-wheel-side body 10 comes into contact with the floor surface and the rear-end rollers 53 of the rear-wheel-side body 50 comes into contact with the floor surface. Because the front-end roller 36, at least a portion of which is disposed at a lower side relative to the footrest, protrudes forward, diagonally downward, or the like from the front-end portion of the footrest, the front-end roller 36 comes into contact with the floor surface, as described above. Also, when the front-wheel-side body 10 and the rear-wheel-side body 50 are further pivoted in order to shift to the folded state, the front-end roller 36 and the rear-end rollers 53 are brought close to each other in the front-to-rear direction and the front wheels 20 and the rear wheels 60 are apart from the floor surface, as shown in FIG. 5.

As has been described above, the electric mobility vehicle in the folded state is supported on the floor surface by the front-end roller 36 and the rear-end rollers 53. Because the front-end roller 36 comes into contact with the floor surface at a front side relative to the front wheels 20, the electric mobility vehicle in the folded state is stably supported by the front-end roller 36, and this contributes to comfortable use of the electric mobility vehicle by the user. The electric mobility vehicle is also similarly stably supported in the case in which the front-end caster is employed instead of the front-end roller 36 also. Although the front-end roller 36 will mainly be described below, the case in which the front-end caster is employed instead of the front-end roller 36 is also the same.

In this embodiment, the front-end roller 36 and the rear-end rollers 53 are rotatable only in the front-to-rear direction. Therefore, when a floor surface is slightly inclined, the movement of the electric mobility vehicle along the inclination is prevented by arranging the front-to-rear direction of the electric mobility vehicle so as to be substantially orthogonal to the inclination direction. This contributes to comfortable use of the electric mobility vehicle by the user. Note that a brake for stopping the rotation of the roller may be provided in at least one of the front-end roller 36 and the rear-end rollers 53, and a stopper, a brake, or the like for stopping the movement of the electric mobility vehicle may be provided at a different location from the front-end roller 36 and the rear-end rollers 53.

Note that, in this embodiment, the electric mobility vehicle in the folded state is supported on the floor surface by the front-end roller 36 and the rear-end rollers 53; however, the electric mobility vehicle in the folded state may be supported on the floor surface by the front-end roller 36 and the rear wheels 60 or other wheels (not shown) of the electric mobility vehicle. Although the rear-wheel-side body 50 is pivoted by 20° or more about the pivoting axis SA in the folding direction in this embodiment, for example, in the case in which the pivoting angle of the rear-wheel-side body 50 in the folding direction is equal to or less than 10°, the rear-end rollers 53 do not come into contact with the floor surface. Even in this case, the front-end roller 36 comes into contact with the floor surface at a front side relative to the front wheels 20 and the front-end roller 36 and the rear wheels 60 are rotatable only in the front-to-rear direction; therefore, the same effects as described above could be afforded.

In addition, in this embodiment, the rear-end rollers 53 come into contact with the floor surface at a rear side of the vehicle relative to the rear wheels 60. Consequently, the electric mobility vehicle in the folded state becomes more stable, which contributes to comfortable use of the electric mobility vehicle by the user.

The contact surface for the electric mobility vehicle is made of various materials, such as asphalt, concrete, stones, dirt, tiles, plastics, or the like. Because the front-end roller 36 and the rear-end rollers 53 respectively have smaller diameters than the front wheels 20 and the rear wheels 60, the electric mobility vehicle is less likely to move on the contact surface. This is advantageous to prevent the electric mobility vehicle in the folded state from unintentionally moving and contributes to comfortable use of the electric mobility vehicle by the user.

In the case in which the contact surface is relatively flat, as in a floor surface of an airport, a floor surface of a large commercial facility, asphalt, or the like, the user can easily move the electric mobility vehicle in the folded state by using the front-end roller 36 and the rear-end rollers 53. When doing so, the front-end roller 36 and the rear-end rollers 53 rotate only in the vehicle front-to-rear direction; therefore, the rollers are not oriented in an unintended direction. This contributes to comfortable use of the electric mobility vehicle by the user.

In addition, the footrest frame 32 supporting the front-end roller 36 is a relatively strong frame that links the two front-wheel support portions 31 with each other, the front-wheel support portions 31 being the support portions of the left and right front wheels 20. Consequently, the front-end roller 36 firmly stands alone in the folded state and the number of members dedicated to making the electric mobility vehicle standing alone is low, and this contributes to reducing the weight of the electric mobility vehicle. Consequently, as described above, it is preferable that the front-end roller 36 be secured to the footrest frame 32, more specifically, the roller support portion 36b that supports the axile of the front-end roller 36 be secured to the footrest frame 32.

In addition, it is also possible to fabricate a structure in which the front-end roller 36 is supported by the footrest frame 32 in a form in which the front-end roller 36 can be moved in the front-to-rear direction or the up-down-direction. For example, it is also possible to secure a known linear guide to the footrest frame 32 and to support the front-end roller 36 by means of the linear guide so as to be movable in the front-to-rear direction. In this case, the front-end roller 36 is disposed at a lower side relative to the footrest by means of the linear guide in the in-use state. In addition, when shifting to the folded state, the front-end roller 36 is moved forward of the vehicle by means of the linear guide, and at least a portion of the front-end roller 36 protrudes from the front-end portion of the footrest. In this embodiment, the front-end roller 36 is attached to the footrest frame 32 so that the position thereof does not change, and said configuration contributes to enabling the electric mobility vehicle in the folded state to stably stand alone and reducing the weight thereof. This contributes to comfortable use of the electric mobility vehicle by the user.

Alternatively, in the case in which the foot plate (footrest) 35 is pivotable, as described above, there are cases in which the front-end roller 36 is disposed at a lower side relative to the foot plate 35, on which the foot is placed when the foot plate 35 is at the lower-side pivoting position, and the front-end roller 36 does not protrude from the front-end portion of the foot plate 35. In this case, when shifting to the folded state, the front-end roller 36 protrudes toward the front side, diagonally downward, downward, etc. from the front-end portion of the foot plate as a result of the foot plate 35 being pivoted upward. In this case, it is possible to attach the front-end roller 36 to the footrest frame 32 so that the position thereof does not change, and thus, the same effects as described above are afforded.

In addition, the front-end roller 36 is disposed below the position corresponding to the center portion in the vehicle width direction in the footrest. Consequently, it is less likely that the front-end roller 36 and the wheelhouse 35a become an obstacle when the passenger places his/her foot on the footrest. It is also possible to provide two or more front-end rollers 36 below the center portion in the vehicle width direction in the footrest. In this case also, the same effects as described above could be afforded.

Note that, for example, in the case in which the front-end roller 36 is small, it is also possible to dispose two or more front-end rollers 36 at a lower side relative to the footrest with a spacing therebetween in the width direction. There may be cases in which said spacing is equal to or more than 10 cm or equal to or more than 20 cm.

In one example, the front wheels 20 are apart from a floor surface by a distance of 1 cm or less in the folded state. Because the front-end roller 36 is disposed at the position corresponding to the center portion in the width direction, there is a case in which the electric mobility vehicle in the folded state moves to fall in the width direction. In this case, because the front wheels 20 are apart from the floor surface by a distance of 1 cm or less, the front wheels 20 contribute to preventing the electric mobility vehicle from falling down. It is more preferable that said distance be equal to or less than 5 mm. The front wheels 20 may be in contact with a contact surface in the folded state. In this case also, so long as a greater load is exerted on the front-end roller 36 as compared with the respective front wheels 20, the electric mobility vehicle in the folded state is stably supported by the front-end roller 36.

Figure 12:
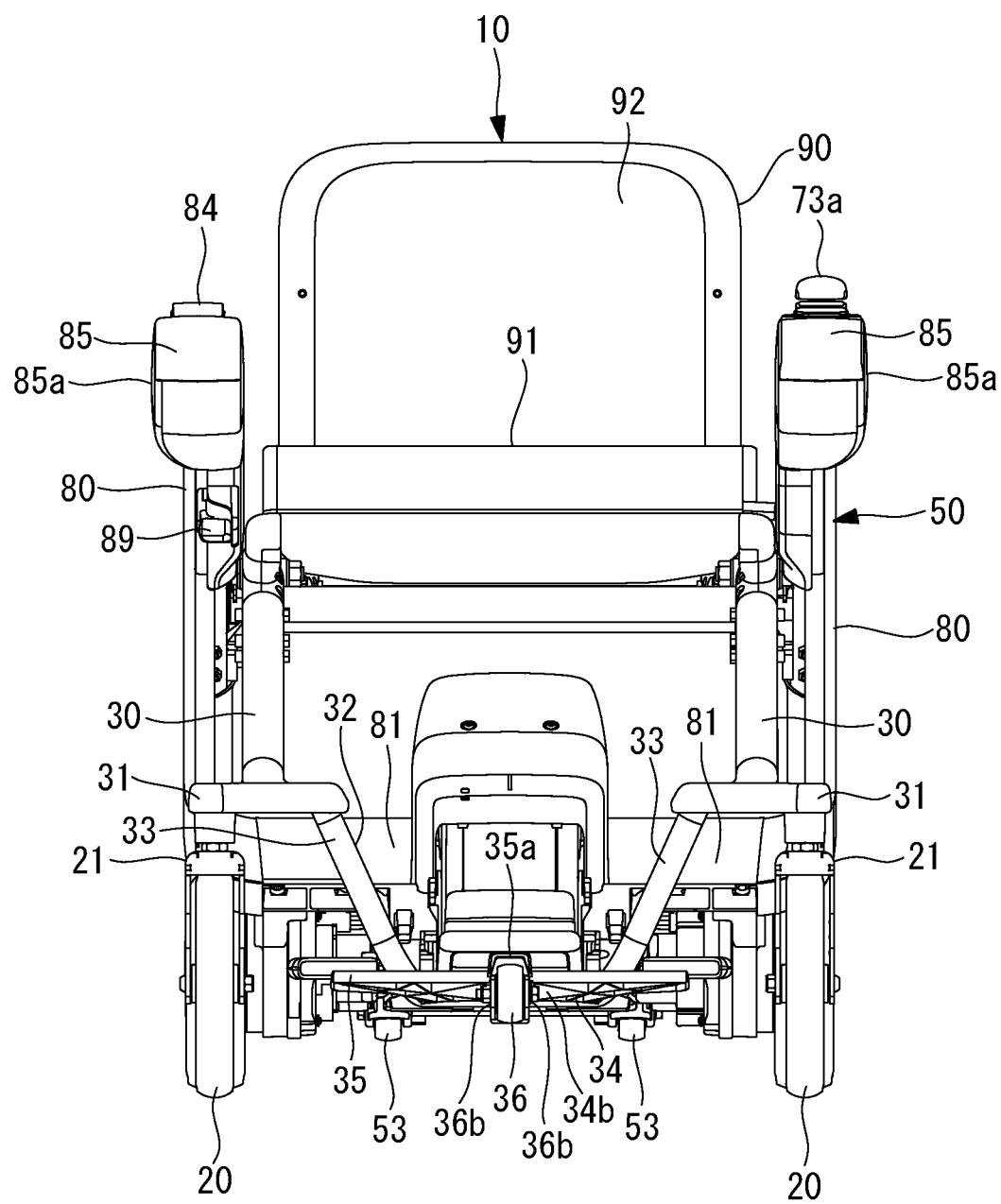
FIG. 12 is a front view of the electric mobility vehicle of this embodiment.

As shown in FIG. 2, in the top-end-side portions 85, protrusions 85a that have shapes that protrude farther inside in the width direction as compared with other portions of the top-end-side portions 85 are formed. The protrusions 85a come into contact with, for example, outer sides of the thighs or knees of the passenger in a continuous or intermittent manner, which facilitates stabilizing the posture of the passenger. In this embodiment, as shown in FIG. 12, it is possible to respectively remove the pair of top-end-side portions 85 from the corresponding up-down-direction extension portions 80 and exchange the left and right top-end-side portions 85 of the pair of up-down-direction extension portions 80 with each other or to invert the orientations of the top-end-side portions 85 in the width direction. At this time, it is possible to attach the top-end-side portions 85 to the up-down-direction extension portions 80 in an orientation in which the protrusions 85a protrude outward in the width direction. Said configuration can be realized at low cost and contributes to comfortable use of the electric mobility vehicle by a passenger having a large body. Note that it is also possible to prepare other top-end-side portions 85 that do not have protrusions 85a that protrude inward in the width direction. In addition, it is also possible to configure the position of the operating portion 73 in FIG. 12 so that said position remains at the position in FIG. 2.

Figure 13:
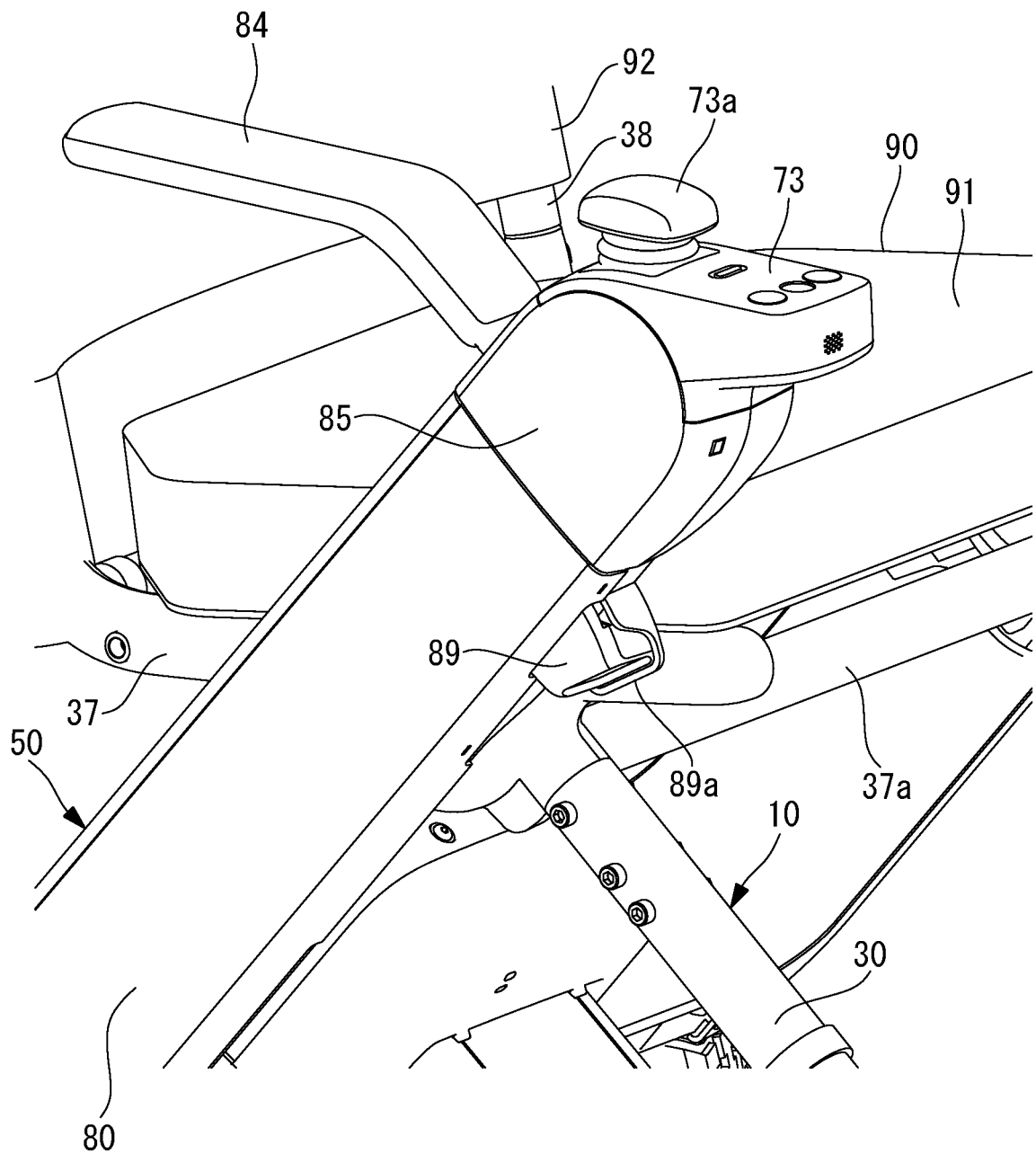
FIG. 13 is a perspective view of relevant portions of the electric mobility vehicle of this embodiment.
Figure 14:
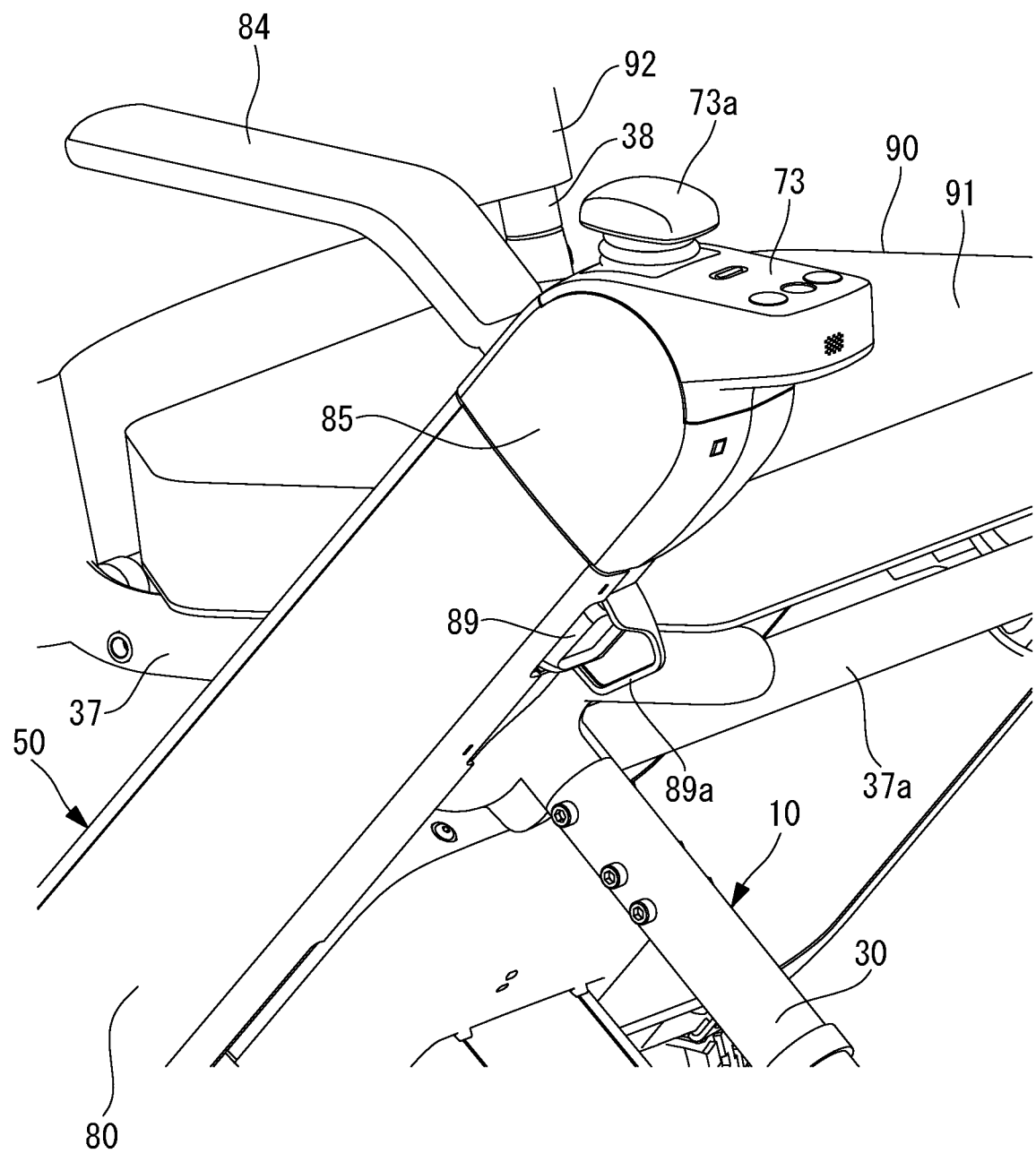
FIG. 14 is a perspective view of relevant portions of the electric mobility vehicle of this embodiment.

As shown in FIGS. 13 and 14, it is preferable that a fixed member 89a that cannot be pushed down together with the operated member 89 be provided at an inside in the width direction relative to the operated member 89. The fixed member 89a is secured to, for example, the right-side up-down-direction extension portion 80 and protrudes from a front-side surface of the up-down-direction extension portion 80 by a dimension that is nearly equal to the dimension of the operated member 89. The protruding dimension of the fixed member 89a may be less or greater than the protruding dimension of the operated member 89. It is preferable that the distance between the operated member 89 and the fixed member 89a be equal to or less than 3 mm, and there are cases in which the operated member 89 and the fixed member 89a are in contact with each other.

As a result of providing the fixed member 89a, it is less likely that the user's hand is disposed at an inside in the width direction relative to the fixed member 89a when the user pushes down the operated member 89. This reduces the risk of the user being injured when performing the folding procedure and the unfolding procedure, which contributes to comfortable use of the electric mobility vehicle.

Note that it is also possible to employ known omnidirectional wheels as the front wheels 20. In omnidirectional wheels in one example, outer circumferential surfaces thereof are formed by a plurality of rollers, the respective plurality of rollers are rotatable in directions along rotation axes of the omnidirectional wheels, and the omnidirectional wheels are movable in directions along said rotation axes.

The front-end caster has, for example, a wheel, a pair of plate-like support portions that face each other in the vehicle width direction and that support the wheel, and a base portion that connects the pair of support portions with each other. In the front-end caster, for example, the base portion is secured to the connection portion 34, a bottom surface of the foot plate 35, etc., and, consequently, the front-end caster could be a known fixed-type caster that does not pivot. In addition, the front-end caster could be a known pivoting caster in which the base portion pivots about an axis extending in the up-down-direction at the connection portion 34, the bottom surface of the foot plate 35, etc. The front-end caster could be a type in which a rotary axis of the wheel is directly below the axis, a type in which the rotary axis of the wheel is not directly below the axis, or the like.

The front-end caster may be a known ball caster in which a metal ball is supported in a freely rotatable manner, a caster in which a wheel rolls in the front-to-rear direction and the left-to-right direction, or the like. In this case also, the electric mobility vehicle in the folded state is stably supported by the front-end caster.

In the respective embodiments, described above, when the electric mobility vehicle is not in the in-use state, said electric mobility vehicle may be set to a disabled state in which the operation of the operation lever 73a or the like of the operating portion 73 is disabled. The disabled state can also be considered to be a state in which traveling is not possible. For example, the controller 70 sets the electric mobility vehicle to the disabled state on the basis of detection results from an inclination sensor 74 (FIG. 15) provided in the operating portion 73 or the setting portion at the top-end side of the up-down-direction extension portions 80. In the disabled state, the rear wheels 60 are not driven by the motors M even if the operating portion 73 receives inputs. It is possible to employ a known inclination sensor, such as a capacitive inclination sensor, a MEMS inclination sensor, or a crystal-type inclination sensor, as the inclination sensor 74.

In the state in which the in-use state is maintained by the engaging portion 110 of the linking mechanism 100, the inclination sensor 74 does not output a signal indicating that the electric mobility vehicle is tilted. On the other hand, when the holding of the in-use state by the engaging portion 110 is released, the front-wheel-side body 10 and the rear-wheel-side body 50 pivot about the pivoting axis SA with respect to each other, and the rear-wheel-side body 50 is tilted beyond a prescribed angle from the in-use state, the inclination sensor 74 outputs the signal indicating that the electric mobility vehicle is tilted. The prescribed angle is, for example, several degrees, preferably 3° or greater. When the controller 70 connected to the inclination sensor 74 receives the signal indicating that the electric mobility vehicle is tilted, the controller 70 sets the electric mobility vehicle to the disabled state.

Note that the inclination sensor 74 may be attached to another portion of the rear-wheel-side body 50 and may be attached to the front-wheel-side body 10. In such cases also, the same effects as described above could be afforded.

In addition, it is also possible to employ, instead of the inclination sensor 74, an engagement detection sensor that detects releasing of the engagement between the engaging portion 110 and the first engaged portion 121. It is possible to employ a switch provided inside the first engaged portion 121 or the engaging portion 110 as said engagement detection sensor. In this case, the controller 70 sets the electric mobility vehicle to the disabled state on the basis of the detection results of the engagement detection sensor connected to the controller 70.

Figure 15:
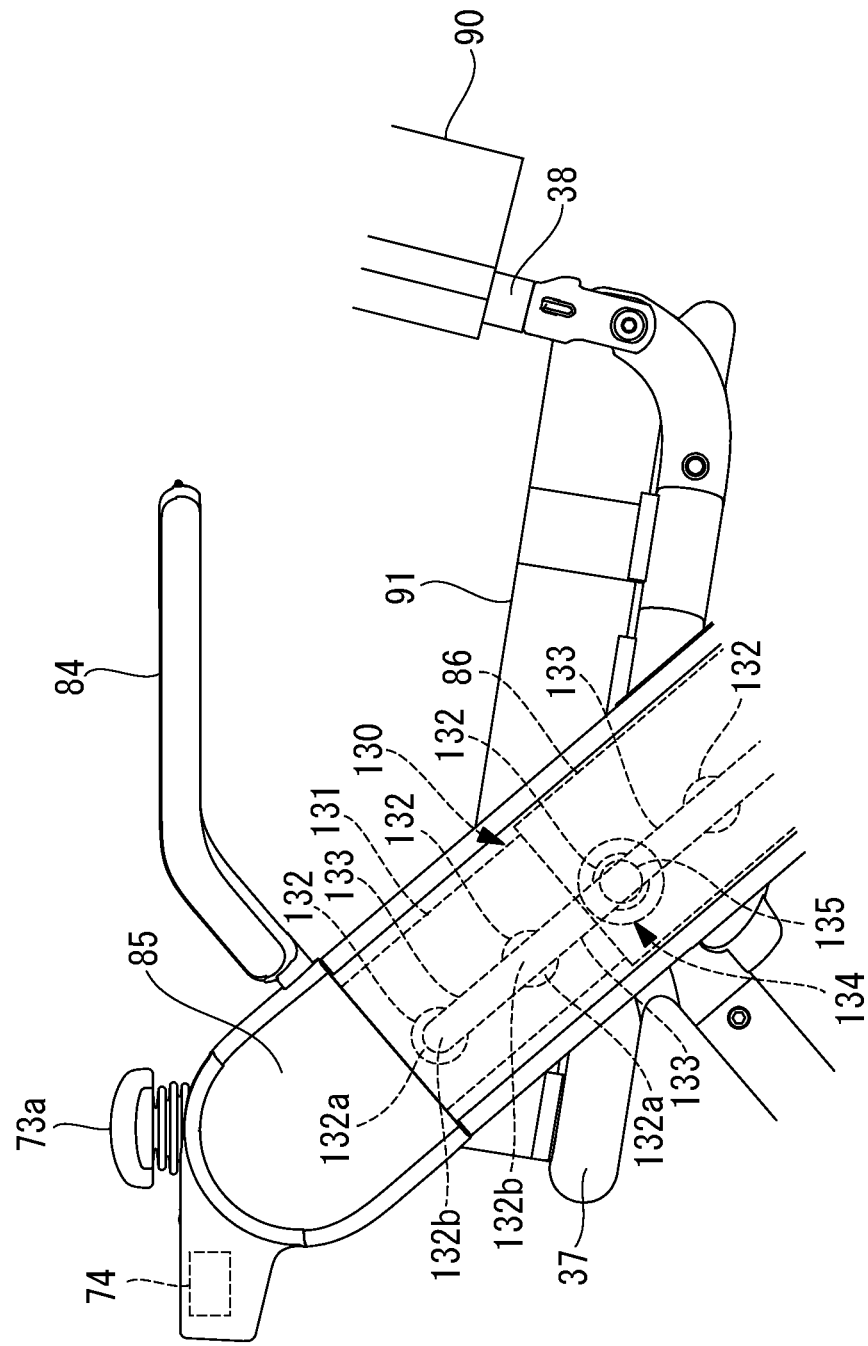
FIG. 15 is a partial side view of an electric mobility vehicle of a modification of this embodiment.
Figure 16:
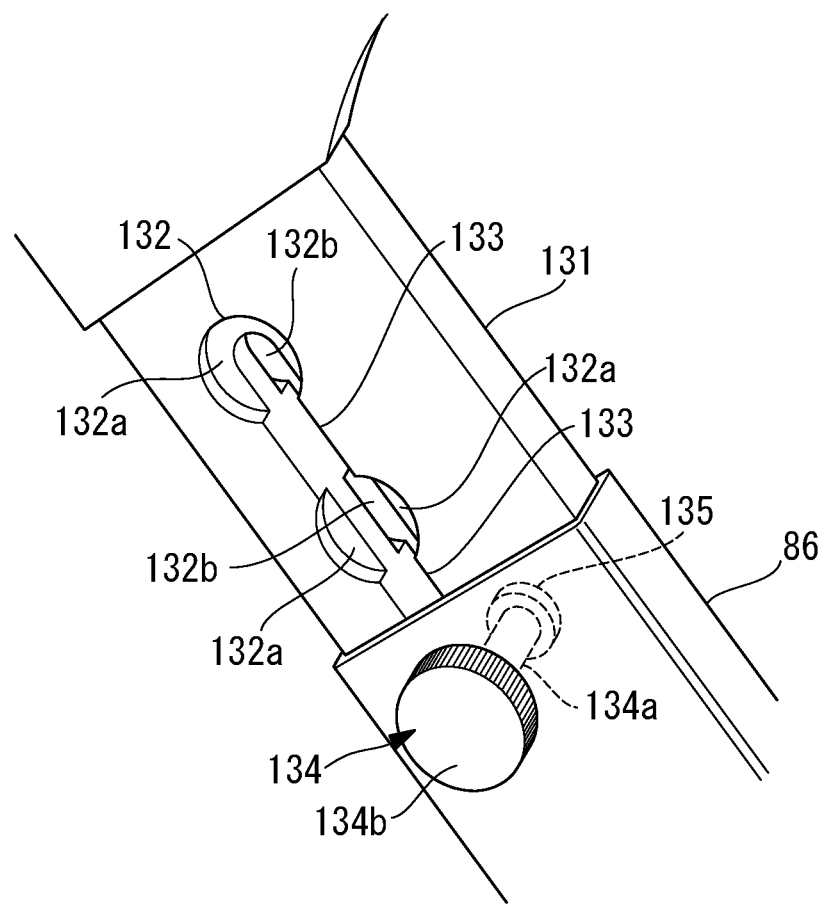
FIG. 16 is a perspective view of the relevant portions of components of the electric mobility vehicle of the modification of this embodiment.

In addition, as shown in FIGS. 15 and 16, adjustment mechanisms 130 for adjusting the height positions of the top-end-side portions 85 of the up-down-direction extension portions 80 may be provided. The adjustment mechanisms 130 at least have, for example, inner frames 131 and fixed members 134 that are disposed inside the metal frames 86 of the up-down-direction extension portions 80. The inner frames 131 are secured to the top-end-side portions 85 and extend diagonally downward from the top-end-side portions 85. The metal frames 86 have internal spaces in which cross-sectional shapes thereof are rectangular, and the external shapes of the inner frames 131 are slightly smaller than the internal shapes of the internal spaces. The inner frames 131 have a plurality of alignment portions 132 that are provided with a spacing between each in the length direction thereof and a plurality of connection holes 133 that connect the plurality of alignment portions 132 with each other.

The respective alignment portions 132 have engagement structures 132a, such as depressions, that can engage with the fixed members 134 in the length directions of the inner frames 131 and penetrating portions 132*b* that penetrate the inner frames 131 in the vehicle width direction. In FIGS. 15 and 16, the penetrating portions 132*b* are disposed inside the engagement structures 132*a*. The respective connection holes 133 penetrate the inner frames 131 in the vehicle width direction and connect the two adjacent penetrating portions 132*b*.

As shown in FIG. 16, the fixed members 134 having threaded portions 134*a* pass through holes (not shown) provided in one of surfaces of the metal frames 86, the penetrating portions 132*b*, and holes (not shown) provided in the other surfaces of the metal frames 86, and are screwed into nut members 135. The fixed members 134 may be screwed into the holes (not shown) provided in the other surfaces. It is also possible to employ a structure in which the threaded portions 134*a* are provided in the nut members 135 and the fixed members 134 are screwed onto the threaded portions 134*a*. The fixed members 134 have plastic grip portions 134*b* for rotating the threaded portions 134*a* about center axes by hand. The shapes of the grip portions 134*b* can be changed, as appropriate. When the fixed members 134 are tightened by means of the rotation by employing the grip portions 134*b*, portions of the fixed members 134 abut against the engagement structures 132*a*. Consequently, the inner frames 131 are pressed against the metal frames 86 in the vehicle width direction, the portions of the fixed members 134 engage with the engagement structures 132*a* in the length directions of the inner frames 131. In other words, the inner frames 131 are secured to the metal frames 86.

In addition, when the fixed members 134 are rotated in loosening directions and the portions of the fixed members 134 are disposed outside the engagement structures 132*a*, it becomes possible to move the inner frames 131 with respect to the metal frames 86 in the longitudinal directions thereof. As a result of providing the connection holes 133, it is possible to move the inner frames 131 with respect to the metal frames 86 in the longitudinal directions thereof without removing the threaded portions 134*a* of the fixed members 134 from the penetrating portions 132*b*. When the threaded portions 134*a* of the fixed members 134 are disposed inside the connection holes 133, the inner frames 131 are prevented from rapidly moving, due to the weights thereof, with respect to the metal frames 86.

The inner frames 131 are components secured to the top-end-side portions 85. Consequently, it is possible to adjust the height positions of the top-end-side portions 85 by moving the inner frames 131 with respect to the metal frames 86 in the longitudinal directions thereof, as described above. In addition, when the fixed members 134 are engaged with the engagement structures 132*a* corresponding to desired height positions by tightening the fixed members 134, the top-end-side portions 85 are secured at those height positions.

In recent years, motorized wheelchairs are being employed. It is conceivable to motorize a folding wheelchair. To motorize a folding wheelchair, in general, because the front wheels, which are caster wheels, cannot be driven by motors, the pair of rear wheels are individually driven by a pair of motors. With said configuration, the wheelchair can be moved forward, moved backward, turned right, turned left, etc. by controlling the driving speed and the direction of each motor.

However, attaching motors, a battery, a controller, etc. to the folding wheelchair for the purpose of motorization results in a weight increase such that the wheelchair weighs 10 kg or more, oftentimes 20 kg or more. It is preferable that the dimension of a folded wheelchair in the front-to-rear direction of the vehicle be small. On the other hand, decreasing the diameters of front wheels and rear wheels of an electric wheelchair results in considerable deterioration of the ride quality, the step climbing performance, etc. Consequently, folding the above-described wheelchair by using the above-described method in a state in which the weight thereof is increased, as described above, causes the folded wheelchair to be supported on a floor surface by the front wheels and the rear wheels in which ground contact positions thereof are close to each other in the front-to-rear direction of the vehicle. This limits the options for storage places of the folded wheelchair and results in an increase in the number of things that a user should be careful about regarding floor surfaces of storage places, etc. In addition, users often feel that the stability of a folded wheelchair is important, and employing a large structure for stably supporting a folded wheelchair on a floor surface results in an increase in the wheelchair weight, a complicated folding procedure, etc.

In light of the above-described circumstances, there is a demand for an electric mobility vehicle that a user can comfortably use.

The following aspects are derived from the above disclosure.

A first aspect of the present invention is an electric mobility vehicle including: a front-wheel-side body including a front wheel; a rear-wheel-side body including a rear wheel; a seat on which a passenger sits in an in-use state; and a linking mechanism that links the front-wheel-side body with the rear-wheel-side body so as to be pivotable about a pivoting axis extending in a vehicle width direction, wherein the electric mobility vehicle is foldable. A folded state is achieved by pivoting the front-wheel-side body and the rear-wheel-side body relative to each other in a vehicle front-to-rear direction so that the front wheel and the rear wheel are brought close to each other, the electric mobility vehicle includes: a footrest which is provided in the front-wheel-side body and on which the passenger on the seat places his/her feet, a front-end roller provided in the front-wheel-side body and disposed at a vehicle front side of the electric mobility vehicle relative to a front end of the front wheel in the in-use state, wherein the front-end roller does not come into contact with a floor surface in the in-use state, and wherein the front-end roller comes into contact with the floor surface in the folded state to make the electric mobility vehicle stand alone.

It is preferable that the seat be supported by a seat support portion constituted by a portion of the front-wheel-side body and the pivoting axis be disposed at a position at which the pivoting axis passes through the seat support portion or in a vicinity of the seat support portion, and thereby the front-wheel-side body and the rear-wheel-side body take substantially an X-shape when viewed from the width direction of the vehicle.

A second aspect of the present invention is an electric mobility vehicle including: a front-wheel-side body including a front wheel; a rear-wheel-side body including a rear wheel; a seat on which a passenger sits in an in-use state; and a linking mechanism that links the front-wheel-side body with the rear-wheel-side body so as to be pivotable about a pivoting axis extending in a vehicle width direction, wherein the electric mobility vehicle is foldable by employing an X-shaped frame with which a folded state is achieved by pivoting the front-wheel-side body and the rear-wheel-side body relative to each other in a vehicle front-to-rear direction so that the front wheel and the rear wheel are brought close to each other, the electric mobility vehicle includes: a footrest which is provided in the front-wheel-side body and on which the passenger on the seat places his/her feet, a front-end roller or a front-end caster provided in the front-wheel-side body and disposed at a vehicle front side of the electric mobility vehicle relative to a front end of the front wheel in the in-use state, wherein the front-end roller or the front-end caster does not come into contact with a floor surface in the in-use state, and wherein the front-end roller or the front-end caster comes into contact with the floor surface in the folded state to make the electric mobility vehicle stand alone. The seat has a seat surface support frame that functions as a portion of a seat surface portion and the pivoting axis is disposed at a position at which the pivoting axis passes through the seat surface or the seat surface support frame or in a vicinity of the seat surface or the seat surface support frame, and thereby the front-wheel-side body and the rear-wheel-side body take substantially an X-shape when viewed from the width direction of the vehicle.

A third aspect of the present invention is an electric mobility vehicle including: a front-wheel-side body including a front wheel which is a caster or an omnidirectional wheel; a rear-wheel-side body including a rear wheel; a seat on which a passenger sits in an in-use state; and a linking mechanism that links the front-wheel-side body with the rear-wheel-side body so as to be pivotable about a pivoting axis extending in a vehicle width direction, wherein the electric mobility vehicle is foldable by employing an X-shaped frame with which a folded state is achieved by pivoting the front-wheel-side body and the rear-wheel-side body relative to each other in a vehicle front-to-rear direction so that the front wheel and the rear wheel are brought close to each other, the electric mobility vehicle includes: a footrest which is provided in the front-wheel-side body and on which the passenger on the seat places his/her feet, a front-end roller or a front-end caster provided in the front-wheel-side body and disposed at a vehicle front side of the electric mobility vehicle relative to a front end of the front wheel in the in-use state, wherein the front-end roller or the front-end caster does not come into contact with a floor surface in the in-use state, and wherein the front-end roller or the front-end caster comes into contact with the floor surface in the folded state to make the electric mobility vehicle stand alone. The front-end roller or the front-end caster is rotatable only in the vehicle front-to-rear direction in the folded state.

A fourth aspect of the present invention is an electric mobility vehicle including: a front-wheel-side body including a pair of front wheels arranged in a width direction of the electric mobility vehicle; a rear-wheel-side body including a rear wheel; a seat on which a passenger sits in an in-use state; and a linking mechanism that links the front-wheel-side body with the rear-wheel-side body so as to be pivotable about a pivoting axis extending in a vehicle width direction, wherein the electric mobility vehicle is foldable by employing an X-shaped frame with which a folded state is achieved by pivoting the front-wheel-side body and the rear-wheel-side body relative to each other in a vehicle front-to-rear direction so that the front wheels and the rear wheel are brought close to each other, the electric mobility vehicle includes: a footrest which is provided in the front-wheel-side body and on which the passenger on the seat places his/her feet, a front-end roller or a front-end caster provided in the front-wheel-side body and disposed at a vehicle front side of the electric mobility vehicle relative to a front end of the front wheels in the in-use state, wherein the front-end roller or the front-end caster does not come into contact with a floor surface in the in-use state, and wherein the front-end roller or the front-end caster comes into contact with the floor surface in the folded state to make the electric mobility vehicle stand alone. The front wheels are configured so as to be apart from a floor surface by a distance of 1 cm or less.

A fifth aspect of the present invention is an electric mobility vehicle including: a front-wheel-side body including a front wheel; a rear-wheel-side body including a rear wheel; a seat on which a passenger sits in an in-use state; and a linking mechanism that links the front-wheel-side body with the rear-wheel-side body so as to be pivotable about a pivoting axis extending in a vehicle width direction, wherein the electric mobility vehicle is foldable by employing an X-shaped frame with which a folded state is achieved by pivoting the front-wheel-side body and the rear-wheel-side body relative to each other in a vehicle front-to-rear direction so that the front wheel and the rear wheel are brought close to each other, the electric mobility vehicle includes: a footrest which is provided in the front-wheel-side body and on which the passenger on the seat places his/her feet, a front-end roller or a front-end caster provided in the front-wheel-side body and disposed at a vehicle front side of the electric mobility vehicle relative to a front end of the front wheel in the in-use state, wherein the front-end roller or the front-end caster does not come into contact with a floor surface in the in-use state, and wherein the front-end roller or the front-end caster comes into contact with the floor surface in the folded state to make the electric mobility vehicle stand alone. The front-end roller or the front-end caster is disposed at a position corresponding to a center portion in the width direction of the vehicle in the footrest.

A sixth aspect of the present invention is an electric mobility vehicle including: a front-wheel-side body including a front wheel; a rear-wheel-side body including a rear wheel; a seat on which a passenger sits in an in-use state; and a linking mechanism that links the front-wheel-side body with the rear-wheel-side body so as to be pivotable about a pivoting axis extending in a vehicle width direction, wherein the electric mobility vehicle is foldable by employing an X-shaped frame with which a folded state is achieved by pivoting the front-wheel-side body and the rear-wheel-side body relative to each other in a vehicle front-to-rear direction so that the front wheel and the rear wheel are brought close to each other, the electric mobility vehicle includes: a footrest which is provided in the front-wheel-side body and on which the passenger on the seat places his/her feet, a front-end roller or a front-end caster provided in the front-wheel-side body and disposed at a vehicle front side of the electric mobility vehicle relative to a front end of the front wheel in the in-use state, wherein the front-end roller or the front-end caster does not come into contact with a floor surface in the in-use state, and wherein the front-end roller or the front-end caster comes into contact with the floor surface in the folded state to make the electric mobility vehicle stand alone. The linking mechanism is configured so as to perform pivoting-position restriction that restricts pivoting of the front-wheel-side body with respect to the rear-wheel-side body in the folded state, the rear-wheel-side body has a pair of up-down-direction extension portions that are arranged in a width direction of the vehicle, an operated member that releases the pivoting-position restriction is provided in one of the pair of up-down-direction extension portions, a fixed member that cannot be pushed down together with the operated member is provided at an inside in the width direction of the vehicle relative to the operated member in the up-down-direction extension portion which is provided with the operated member, and the distance between the operated member and the fixed member is equal to or less than 3 mm.

A seventh aspect of the present invention is an electric mobility vehicle including: a front-wheel-side body including a front wheel; a rear-wheel-side body including a rear wheel; a seat on which a passenger sits in an in-use state; and a linking mechanism that links the front-wheel-side body with the rear-wheel-side body so as to be pivotable about a pivoting axis extending in a vehicle width direction, wherein the electric mobility vehicle is foldable by employing an X-shaped frame with which a folded state is achieved by pivoting the front-wheel-side body and the rear-wheel-side body relative to each other in a vehicle front-to-rear direction so that the front wheel and the rear wheel are brought close to each other, the electric mobility vehicle includes: a footrest which is provided in the front-wheel-side body and on which the passenger on the seat places his/her feet, a front-end roller or a front-end caster provided in the front-wheel-side body and disposed at a vehicle front side of the electric mobility vehicle relative to a front end of the front wheel in the in-use state, wherein the front-end roller or the front-end caster does not come into contact with a floor surface in the in-use state, and wherein the front-end roller or the front-end caster comes into contact with the floor surface in the folded state to make the electric mobility vehicle stand alone. The rear-wheel-side body has a pair of up-down-direction extension portions that are arranged in the width direction of the vehicle, the respective up-down-direction extension portions have detachable top-end-side portions, the top-end-side portions include protrusions that have shapes of protruding inward in the width direction of the vehicle and that come into contact with outer sides of the thighs or the knees of the passenger seated on the seat in a continuous or intermittent manner, and each of the up-down-direction extension portions is configured so that the top-end-side portion can be attached in an orientation in which the protrusion is disposed outside in the width direction of the vehicle or so that another top-end-side portion in which the protrusion do not protrude inside in the width direction of the vehicle can be attached.

REFERENCE SIGNS LIST 10 front-wheel-side body
20 front wheel
30 front-wheel support frame
31 front-wheel support portion
32 footrest frame (footrest)
35 foot plate (footrest)
36 front-end roller
50 rear-wheel-side body
51 shaft
60 rear wheel
73 operating portion
80 up-down-direction extension portion
89 operated member
SA pivoting axis
BA battery

The invention claimed is:
1. An electric mobility vehicle comprising:
a front-wheel-side body including a front wheel;
a rear-wheel-side body including a rear wheel;
a seat on which a passenger sits in an in-use state; and
a linking mechanism that links the front-wheel-side body with the rear-wheel-side body so as to be pivotable about a pivoting axis extending in a vehicle width direction, wherein
the electric mobility vehicle is foldable by employing an X-shaped frame with which a folded state is achieved by pivoting the front-wheel-side body and the rear-wheel-side body relative to each other in a vehicle front-to-rear direction so that the front wheel and the rear wheel are brought close to each other,
the electric mobility vehicle includes:
    a footrest which is provided in the front-wheel-side body and on which the passenger on the seat places his/her feet,
    a front-end roller or a front-end caster provided in the front-wheel-side body and disposed at a vehicle front side of the electric mobility vehicle relative to a front end of the front wheel in the in-use state, wherein the front-end roller or the front-end caster does not come into contact with a floor surface in the in-use state, and
wherein the front-end roller or the front-end caster comes into contact with the floor surface in the folded state to make the electric mobility vehicle stand alone,
wherein the seat is supported by a seat support portion constituted by a portion of the front-wheel-side body, and the pivoting axis is disposed at a position at which the pivoting axis passes through the seat support portion or in a vicinity of the seat support portion, and thereby the front-wheel-side body and the rear-wheel-side body take substantially an X-shape when viewed from the vehicle width direction.

2. The electric mobility vehicle according to claim 1, wherein the front wheel is a caster or an omnidirectional wheel, and
the front-end roller or the front-end caster is rotatable only in the vehicle front-to-rear direction in the folded state.

3. The electric mobility vehicle according to claim 1, wherein the front-wheel-side body includes a pair of the front wheels that are arranged in a width direction of the electric mobility vehicle, and
the front wheels are apart from the floor surface by a distance of 1 cm or less when the front-end roller or the front-end caster is brought into contact with the floor surface to make the electric mobility vehicle stand alone.

4. The electric mobility vehicle according to claim 1, wherein the front-end roller or the front-end caster is fixed to a frame of the front-wheel-side body.

5. The electric mobility vehicle according to claim 1, further comprising a fall prevention member which is provided in the rear-wheel-side body and in which a rear-end portion thereof is disposed at a vehicle rear side in the electric mobility vehicle relative to a rear end of the rear wheel in the in-use state,
wherein the fall prevention member includes a rear-end roller at a rear-end portion thereof, and
the rear-end roller comes into contact with the floor surface in the folded state to make the electric mobility vehicle stand alone.

6. The electric mobility vehicle according to claim 1, wherein the front-end roller or the front-end caster is disposed at a position corresponding to a center portion in the vehicle width direction in the footrest.

7. The electric mobility vehicle according to claim 1, wherein the front-end roller or the front-end caster is rotatable only in the vehicle front-to-rear direction.

8. An electric mobility vehicle comprising:
a front-wheel-side body including a front wheel;
a rear-wheel-side body including a rear wheel;
a seat on which a passenger sits in an in-use state; and
a linking mechanism that links the front-wheel-side body with the rear-wheel-side body so as to be pivotable about a pivoting axis extending in a vehicle width direction, wherein
the electric mobility vehicle is foldable by employing an X-shaped frame with which a folded state is achieved by pivoting the front-wheel-side body and the rear-wheel-side body relative to each other in a vehicle front-to-rear direction so that the front wheel and the rear wheel are brought close to each other,
the electric mobility vehicle includes:
 a footrest which is provided in the front-wheel-side body and on which the passenger on the seat places his/her feet,
 a front-end roller or a front-end caster provided in the front-wheel-side body and disposed at a vehicle front side of the electric mobility vehicle relative to a front end of the front wheel in the in-use state, wherein the front-end roller or the front-end caster does not come into contact with a floor surface in the in-use state, and
wherein the front-end roller or the front-end caster comes into contact with the floor surface in the folded state to make the electric mobility vehicle stand alone,
wherein the seat includes a seat surface support frame that functions as a portion of a seat surface portion and the pivoting axis is disposed at a position at which the pivoting axis passes through the seat surface or the seat surface support frame or in a vicinity of the seat surface or the seat surface support frame, and thereby the front-wheel-side body and the rear-wheel-side body take substantially an X-shape when viewed from the vehicle width direction.

9. The electric mobility vehicle according to claim 8, wherein the front wheel is a caster or an omnidirectional wheel, and
the front-end roller or the front-end caster is rotatable only in the vehicle front-to-rear direction in the folded state.

10. The electric mobility vehicle according to claim 8, wherein the front-wheel-side body includes a pair of the front wheels that are arranged in a width direction of the electric mobility vehicle, and
the front wheels are apart from the floor surface by a distance of 1 cm or less when the front-end roller or the front-end caster is brought into contact with the floor surface to make the electric mobility vehicle stand alone.

11. The electric mobility vehicle according to claim 8, wherein the front-end roller or the front-end caster is fixed to a frame of the front-wheel-side body.

12. The electric mobility vehicle according to claim 8, further comprising a fall prevention member which is provided in the rear-wheel-side body and in which a rear-end portion thereof is disposed at a vehicle rear side in the electric mobility vehicle relative to a rear end of the rear wheel in the in-use state,
wherein the fall prevention member includes a rear-end roller at a rear-end portion thereof, and
the rear-end roller comes into contact with the floor surface in the folded state to make the electric mobility vehicle stand alone.

13. The electric mobility vehicle according to claim 8, wherein the front-end roller or the front-end caster is disposed at a position corresponding to a center portion in the vehicle width direction in the footrest.

14. The electric mobility vehicle according to claim 8, wherein the front-end roller or the front-end caster is rotatable only in the vehicle front-to-rear direction.

15. An electric mobility vehicle comprising:
a front-wheel-side body including a front wheel;
a rear-wheel-side body including a rear wheel;
a seat on which a passenger sits in an in-use state; and
a linking mechanism that links the front-wheel-side body with the rear-wheel-side body so as to be pivotable about a pivoting axis extending in a vehicle width direction, wherein
the electric mobility vehicle is foldable by employing an X-shaped frame with which a folded state is achieved by pivoting the front-wheel-side body and the rear-wheel-side body relative to each other in a vehicle front-to-rear direction so that the front wheel and the rear wheel are brought close to each other,
the electric mobility vehicle includes:
 a footrest which is provided in the front-wheel-side body and on which the passenger on the seat places his/her feet,
 a front-end roller or a front-end caster provided in the front-wheel-side body and disposed at a vehicle front side of the electric mobility vehicle relative to a front end of the front wheel in the in-use state, wherein the front-end roller or the front-end caster does not come into contact with a floor surface in the in-use state, and
wherein the front-end roller or the front-end caster comes into contact with the floor surface in the folded state to make the electric mobility vehicle stand alone,
wherein the linking mechanism is configured to perform pivoting-position restriction that restricts pivoting of the front-wheel-side body with respect to the rear-wheel-side body in the folded state,
the linking mechanism includes an operated member that releases the pivoting-position restriction, and
the linking mechanism is configured to allow the operated member to release the pivoting-position restriction when a force in a folding direction is applied to at least one of the front-wheel-side body and the rear-wheel-side body and the linking mechanism is configured so that the pivoting-position restriction cannot be released by operating the operated member when the force in the folding direction is not applied to the at least one of the front-wheel-side body and the rear-wheel-side body.

16. An electric mobility vehicle comprising:
a front-wheel-side body including a front wheel;
a rear-wheel-side body including a rear wheel;
a seat on which a passenger sits in an in-use state; and
a linking mechanism that links the front-wheel-side body with the rear-wheel-side body so as to be pivotable about a pivoting axis extending in a vehicle width direction, wherein
the electric mobility vehicle is foldable by employing an X-shaped frame with which a folded state is achieved by pivoting the front-wheel-side body and the rear-wheel-side body relative to each other in a vehicle front-to-rear direction so that the front wheel and the rear wheel are brought close to each other,
the electric mobility vehicle includes:
 a footrest which is provided in the front-wheel-side body and on which the passenger on the seat places his/her feet, a front-end roller or a front-end caster provided in the front-wheel-side body and disposed at a vehicle front side of the electric mobility vehicle relative to a front end of the front wheel in the in-use state, wherein the front-end roller or the front-end caster does not come into contact with a floor surface in the in-use state, and wherein the front-end roller or the front-end caster comes into contact with the floor surface in the folded state to make the electric mobility vehicle stand alone, wherein the rear-wheel-side body includes a pair of up-down-direction extension portions that are arranged in the vehicle width direction, lower-side portions in the respective up-down-direction extension portions, which are located at lower sides relative to the pivoting axis, extend diagonally forward to a position of the pivoting axis from bottom-end sides of the up-down-direction extension portions, and a thickness of each of the lower-side portions are equal to or greater than 8 cm over substantially the entirety of the lower-side portion in its longitudinal direction and the thickness is a dimension in a direction orthogonal to the longitudinal direction in a direction corresponding to the vehicle front-to-rear direction.

17. An electric mobility vehicle comprising:
a front-wheel-side body including a front wheel;
a rear-wheel-side body including a rear wheel;
a seat on which a passenger sits in an in-use state; and
a linking mechanism that links the front-wheel-side body with the rear-wheel-side body so as to be pivotable about a pivoting axis extending in a vehicle width direction, wherein the electric mobility vehicle is foldable by employing an X-shaped frame with which a folded state is achieved by pivoting the front-wheel-side body and the rear-wheel-side body relative to each other in a vehicle front-to-rear direction so that the front wheel and the rear wheel are brought close to each other, the electric mobility vehicle includes:
  a footrest which is provided in the front-wheel-side body and on which the passenger on the seat places his/her feet,
  a front-end roller or a front-end caster provided in the front-wheel-side body and disposed at a vehicle front side of the electric mobility vehicle relative to a front end of the front wheel in the in-use state, wherein the front-end roller or the front-end caster does not come into contact with a floor surface in the in-use state, and wherein the front-end roller or the front-end caster comes into contact with the floor surface in the folded state to make the electric mobility vehicle stand alone, wherein the linking mechanism is configured to perform pivoting-position restriction that restricts pivoting of the front-wheel-side body with respect to the rear-wheel-side body in the folded state, the rear-wheel-side body includes a pair of up-down-direction extension portions that are arranged in the vehicle width direction, an operated member that releases the pivoting-position restriction is provided in one of the pair of up-down-direction extension portions, a fixed member that cannot be pushed down together with the operated member is provided at an inside in the vehicle width direction relative to the operated member in the up-down-direction extension portions to which the operated member is provided, and the distance between the operated member and the fixed member is equal to or less than 3 mm.

18. An electric mobility vehicle comprising:
a front-wheel-side body including a front wheel;
a rear-wheel-side body including a rear wheel;
a seat on which a passenger sits in an in-use state; and
a linking mechanism that links the front-wheel-side body with the rear-wheel-side body so as to be pivotable about a pivoting axis extending in a vehicle width direction, wherein the electric mobility vehicle is foldable by employing an X-shaped frame with which a folded state is achieved by pivoting the front-wheel-side body and the rear-wheel-side body relative to each other in a vehicle front-to-rear direction so that the front wheel and the rear wheel are brought close to each other, the electric mobility vehicle includes:
  a footrest which is provided in the front-wheel-side body and on which the passenger on the seat places his/her feet,
  a front-end roller or a front-end caster provided in the front-wheel-side body and disposed at a vehicle front side of the electric mobility vehicle relative to a front end of the front wheel in the in-use state, wherein the front-end roller or the front-end caster does not come into contact with a floor surface in the in-use state, and wherein the front-end roller or the front-end caster comes into contact with the floor surface in the folded state to make the electric mobility vehicle stand alone, wherein the rear-wheel-side body includes a pair of up-down-direction extension portions that are arranged in the vehicle width direction, the up-down-direction extension portions include detachable top-end-side portions, respectively, the top-end-side portions include protrusions that have shapes of protruding inward in the vehicle width direction and that come into contact with outer sides of the thighs or the knees of the passenger seated on the seat in a continuous or intermittent manner, and each of the up-down-direction extension portions is configured so that the top-end-side portion can be attached in an orientation in which the protrusion is disposed outside in the vehicle width direction or so that another top-end-side portion in which the protrusion does not protrude inside in the vehicle width direction can be attached.

* * * * *